(12) United States Patent
Geer

(10) Patent No.: US 9,336,534 B2
(45) Date of Patent: May 10, 2016

(54) GEOFENCED EVENT-BASED FAN NETWORKING: SYSTEMS

(71) Applicant: BLEACHR LLC, Edina, MN (US)

(72) Inventor: Bradley C. Geer, Edina, MN (US)

(*) Notice: Subject to any disclaimer, the term of this patent is extended or adjusted under 35 U.S.C. 154(b) by 0 days.

(21) Appl. No.: 14/618,488

(22) Filed: Feb. 10, 2015

(65) Prior Publication Data
US 2015/0264533 A1    Sep. 17, 2015

Related U.S. Application Data

(60) Provisional application No. 61/954,093, filed on Mar. 17, 2014, provisional application No. 61/954,655, filed on Mar. 18, 2014.

(51) Int. Cl.
| | |
|---|---|
| H04W 24/00 | (2009.01) |
| G06Q 30/02 | (2012.01) |
| H04L 29/08 | (2006.01) |
| H04W 4/04 | (2009.01) |
| H04W 4/02 | (2009.01) |
| G06Q 50/00 | (2012.01) |
| H04W 4/08 | (2009.01) |

(52) U.S. Cl.
CPC ........ *G06Q 30/0226* (2013.01); *G06Q 30/0212* (2013.01); *G06Q 30/0258* (2013.01); *H04L 67/10* (2013.01); *H04W 4/021* (2013.01); *H04W 4/04* (2013.01); *G06Q 50/01* (2013.01); *H04W 4/028* (2013.01); *H04W 4/08* (2013.01)

(58) Field of Classification Search
CPC .................................................... H04W 24/00
USPC ...................................................... 455/456.3
See application file for complete search history.

(56) References Cited

U.S. PATENT DOCUMENTS

| | | | |
|---|---|---|---|
| 6,175,831 B1 | 1/2001 | Weinreich et al. | |
| 7,317,927 B2* | 1/2008 | Staton | G08B 21/0211 340/539.13 |
| 7,856,360 B2* | 12/2010 | Kramer et al. | 705/1.1 |
| 8,489,669 B2 | 7/2013 | Johnson | |
| 8,542,599 B1 | 9/2013 | Pons et al. | |
| 8,775,807 B1 | 7/2014 | Vazquez et al. | |
| 2003/0014275 A1 | 1/2003 | Bearden, III et al. | |

(Continued)

OTHER PUBLICATIONS

Amtel, What can you do with Geofencing? Geofencing Examples, http://www.amtelnet.com/mobile-device-management-resources/blog-mdm/can-geofencing; Jan. 20, 2014.

(Continued)

*Primary Examiner* — Huy C Ho
(74) *Attorney, Agent, or Firm* — Beck Tysver Evans PLLC

(57) ABSTRACT

The present invention is a fan networking system (FNS), available through a software application, executing on fans' portable smart devices for an event to be held in a venue. A FNS may offer event-customized services to fans, such as messaging, fan groups, mementos, coupons, "friends", and contests. The level of services might depend on whether a fan is attending; timing (pre-, during, post-performance); for a competitive event, whether the fan affiliates with the home or away team; and the category of fan (e.g., audience, management, performer). Determination of whether a fan is attending may be done with geolocation services, e.g., through GPS. A fan might need to remain within the venue for some period of time to qualify as attending. Services to attending fans may extend for a period beyond the event itself.

30 Claims, 25 Drawing Sheets

(56) References Cited

U.S. PATENT DOCUMENTS

| | | |
|---|---|---|
| 2004/0090950 A1 | 5/2004 | Lauber et al. |
| 2007/0155489 A1 | 7/2007 | Beckley et al. |
| 2008/0065774 A1 | 3/2008 | Keeler |
| 2008/0153511 A1 | 6/2008 | Mock |
| 2008/0255939 A1 | 10/2008 | Harmon et al. |
| 2008/0306826 A1 | 12/2008 | Kramer et al. |
| 2008/0312946 A1 | 12/2008 | Valentine et al. |
| 2009/0243929 A1* | 10/2009 | Sengupta et al. ........ 342/357.15 |
| 2009/0319306 A1 | 12/2009 | Chanick |
| 2010/0042940 A1 | 2/2010 | Monday et al. |
| 2010/0285817 A1 | 11/2010 | Zhao et al. |
| 2010/0332283 A1 | 12/2010 | Ng et al. |
| 2011/0307399 A1 | 12/2011 | Holmes |
| 2012/0150611 A1 | 6/2012 | Isaacson et al. |
| 2012/0158531 A1 | 6/2012 | Dion et al. |
| 2012/0215637 A1 | 8/2012 | Hermann |
| 2013/0085834 A1 | 4/2013 | Witherspoon, Jr. et al. |
| 2013/0093627 A1 | 4/2013 | Cosman |
| 2013/0225282 A1 | 8/2013 | Williams et al. |
| 2013/0260846 A1 | 10/2013 | Kruglick |
| 2013/0275505 A1 | 10/2013 | Gauglitz et al. |
| 2014/0006129 A1 | 1/2014 | Heath |
| 2014/0046802 A1 | 2/2014 | Hosein et al. |
| 2014/0052485 A1 | 2/2014 | Shidfar |
| 2014/0222531 A1 | 8/2014 | Jacobs et al. |
| 2014/0351411 A1 | 11/2014 | Woods et al. |

OTHER PUBLICATIONS

ETRAC, "Geo Fence Setup Instructions", https://www.etracllc.com/etrac/uploads/Geo%20Fence%20Setup%20Instructions.pdf, viewed Jan. 22, 2014.

KARTACA, "Location Based Services"; http://www.kartaca.com/index.php?page=location-based-services; Viewed Jan. 20, 2014.

Maponics, "Social Places: Destination and Venue Boundaries", http://www.maponics.com/products/gis-map-data/social-places/destination-and-venue-boundaries/, viewed Jan. 22, 2014.

Preapps, "JaVu—The Only Local Network with the Power of Geofencing"; http://www.preapps.com/new-iphone-apps/j%C3%A1vu-the-only-local-network-with-the-. . . Viewed Jan. 20, 2014.

Schutzberg, Adena; Elmhurst College, Directions Magazine; "Neighborhoods are Just Predefined Geofences", http://www.directionsmag.com/articles/neighborhoods-are-just-predefined-geofences/315012, viewed Jan. 22, 2014.

thumbvista.com, "Geofencing Services for Retain Stores & Brands"; http://www.thumbvista.com/retail-geofencing-services, Viewed Jan. 20, 2014.

Mar. 25, 2015 USPTO Office Action (U.S. Appl. No. 14/618,512).

May 18, 2015 PCT Search Report (Serial No. PCT/US15/15206).

* cited by examiner

| | TIMING | | DRONE LOCATION | | |
|---|---|---|---|---|---|
| | DURING EVENT | QUALIFIED AS ATTENDING | INSIDE OB | INSIDE MB | INSIDE IB |
| NO MONITORING | NO | | | | |
| LORES MONITORING | YES | YES | | | |
| HIRES MONITORING | YES | NO | YES | | |
| QUALIFYING | YES | NO | | | YES |
| PRESENT | YES | YES | | YES | |

FIG. 13

GEOFENCED EVENT-BASED FAN NETWORKING: SYSTEMS

CROSS-REFERENCES TO RELATED APPLICATIONS

This application claims the benefit of U.S. Provisional Application No. 61/954,093 filed Mar. 17, 2014, and entitled "Fan Networking Using Geofencing: System and Method"; and the benefit of U.S. Provisional Application No. 61/954,655 filed Mar. 18, 2014, and entitled "Fan Networking Using Geofencing: System and Method". This application is related to U.S. application Ser. No. 14/618,512, filed Feb. 10, 2015, and entitled "Geofenced Event-Based Fan Networking: Methods". This application is related to U.S. application Ser. No. 14/618,533, filed Feb. 10, 2015, and entitled "Geofenced Event-Based Fan Networking: Space-Time Dependence". This application is related to International Application No. PCT/US15/15206, filed Feb. 10, 2015, and entitled "Geofenced Event-Based Fan Networking". All five of these applications are hereby incorporated in their entirety by this reference.

FIELD OF THE INVENTION

The present invention relates to social networking at an event in a venue. More specifically, it relates to providing such functionality through geolocated portable smart devices that depends upon fan and event state.

BACKGROUND OF THE INVENTION

A portable smart device (PSD) is a portable electronic device having a processing system and a housing, which is conveniently carried by a human being on their person. Examples include a cellular phone, a portable music player, a tablet computer, an e-reader, a portable computer, a smart watch, smart glasses, or other wearable smart device. Typically, a PSD will have means for information entry—a user interface (UI), which might include a display, e.g., a touch screen; a keyboard; tactile controls; a camera; a microphone; a sound system; or tactile output, such as vibration. A PSD may have access to a network (e.g., a local, wide area, and/or personal network) through one or more wireless interfaces, such as WiFi, cellular network, or BLUETOOTH®. The processing system may include a processor, and various forms of tangible nontransitory computer-accessible storage. The PSD may facilitate geolocation of the device by one or more technologies, such as GPS, beacons, or cell phone towers, alone or in combination. Such a PSD can be tracked geographically, with varying accuracy depending upon the location technology(ies) used.

Logic on a PSD with GPS can determine its location and how its location changes over time. An application running on the PSD can transmit its location to a remote system. Thus, so long as GPS is enabled, such a device can be tracked, often with 10 m horizontal resolution or better. GPS location is available in many places outdoors, but might not be available inside some buildings. Within a building, beacons or other technologies may be viable for tracking a PSD.

Some PSDs have multiple modes of location services, a high resolution (HIRES) mode and at least one low resolution (LORES) mode. A LORES mode provides less location accuracy than HIRES mode, but uses fewer or different resources of the PSD, and so consumes less electricity. Typically, electricity is provided to a PSD by a battery that must be recharged periodically. Useful battery life between charging events can be short. A software application running on the PSD can specify to the operating system when it requires HIRES mode and when LORES mode is adequate. When a LORES mode is adequate for one application, another application might still require the operating system to keep the PSD in HIRES mode. Thus, while HIRES tracking can be demanded by a PSD, transition from HIRES to LORES mode can merely be suggested. Access to these location tracking levels and functions may be provided to software executing on the PSD as services by its operating system.

SUMMARY OF THE INVENTION

The present invention is a fan networking system (FNS), available through a social networking application (SNA) dedicated to fans of some event or collection of events, and implemented by a software application on their PSDs—i.e., a fan networking app (FNA). The FNA, interacting with a fan through the UI of the PSD, is a proxy for the fan. Exemplary events include a sports competition, an orchestra concert, a state fair, or a day at an amusement park. A FNS offers customized services to fans, such as messaging, fan groups, friends networking, mementos, coupons, and contests. Such services might be customized based, for example, upon event(s), venue(s), or team(s). The level of event networking services (ENSs) offered by a fan network management system (FNMS), a facility central to the FNS, might depend on the type of event; whether a fan is attending; fan geographic location relative to a venue; timing (pre-, during, post-performance); for a competitive event, whether the fan affiliates with the home or away team; and the category of fan (e.g., audience, management, performer). A fan might need to register with the FNMS to access ENSs. Determination of whether a fan qualifies as attending an event, and the fan's position in or near venue, may be done with geolocation of their PSD, e.g., through GPS. A fan might be required by the FNMS to remain within the venue for some period of time to qualify as attending. Services to attending fans may extend for a period beyond the event itself; some services might be extended to fans who are not in attendance.

In some embodiments, the FNA may determine whether social networking "friends" of an individual are present at the performance or event. Declaring another person to be a "friend" (or some similar term, such as "follower" or "contact") might be done through another social networking application (SNA), such as FACEBOOK® or LINKEDIN®. The FNS may have access to, and take advantage of, lists of friends from other SNAs. The FNMS might then facilitate communications directly among the friends, as well as communication with attendees at large. Special services or benefits might be offered to groups of friends.

A FNMS might manage, in any combination, ENSs for a single event; a group of events; or for a set of groups of events. For example, the FNMS might manage all events of a particular team; or a particular league; or a particular venue; or a particular set of forums; or any combination of teams, leagues, venues, forums, performers, or groups of performers. The FNS, through the FNA, might give the user access to any subset of events that it manages. There may or may not be charges for registration with the FNMS, or charges for FNS participation at some or all events or collections of events. These charges might be collected by the FNMS through the FNA. The fan, through the UI of the FNA on their PSD, might be able to configure which events or groups of events for which they choose to access fan networking from access provided by the FNA. The FNMS might provide ENSs for some subset of those events to which they provide access to the fan. For example, a fan of a baseball team might have fan networking at all games of the league that includes the team. The FNMS might conceivably provide fan networking access for a given user to all events for which the FNS is implemented, simply detecting through their FNA the presence of fans at such events. Thus, a single FNA might automatically provide ENSs to a given fan at a wrestling match and at a ballet by detecting their attendance through one or more FNMSs.

The FNS might confer "points" on fans for various reasons. For example, a fan might accrue points for attending events. A fan might get bonus points for some achievements, such as attending enough games within a season to be considered a "super-fan". The points might be awarded for events of the same type (e.g., all games of a given baseball team); or for events of multiples types (e.g., all events managed by a FNMS). A fan might accrue points for making certain purchases; for initially joining the FNS; or for participating in certain contests, games, or competitions. Points might be redeemable for goods, services, or cash. A fan may be able to wager points against other fans or groups of fans on, for example, certain outcomes in a game; or participate in a prediction market relating to the event. What is permissible with regard to points may vary among legal jurisdictions.

BRIEF DESCRIPTION OF THE DRAWINGS

FIG. 13 is a table that illustrates possible effects of timing and location of the PSD of a fan upon monitoring level, and upon state of the fan as present, or as qualifying to be present, for an event.

DETAILED DESCRIPTION OF EXEMPLARY EMBODIMENTS

Figure 1:
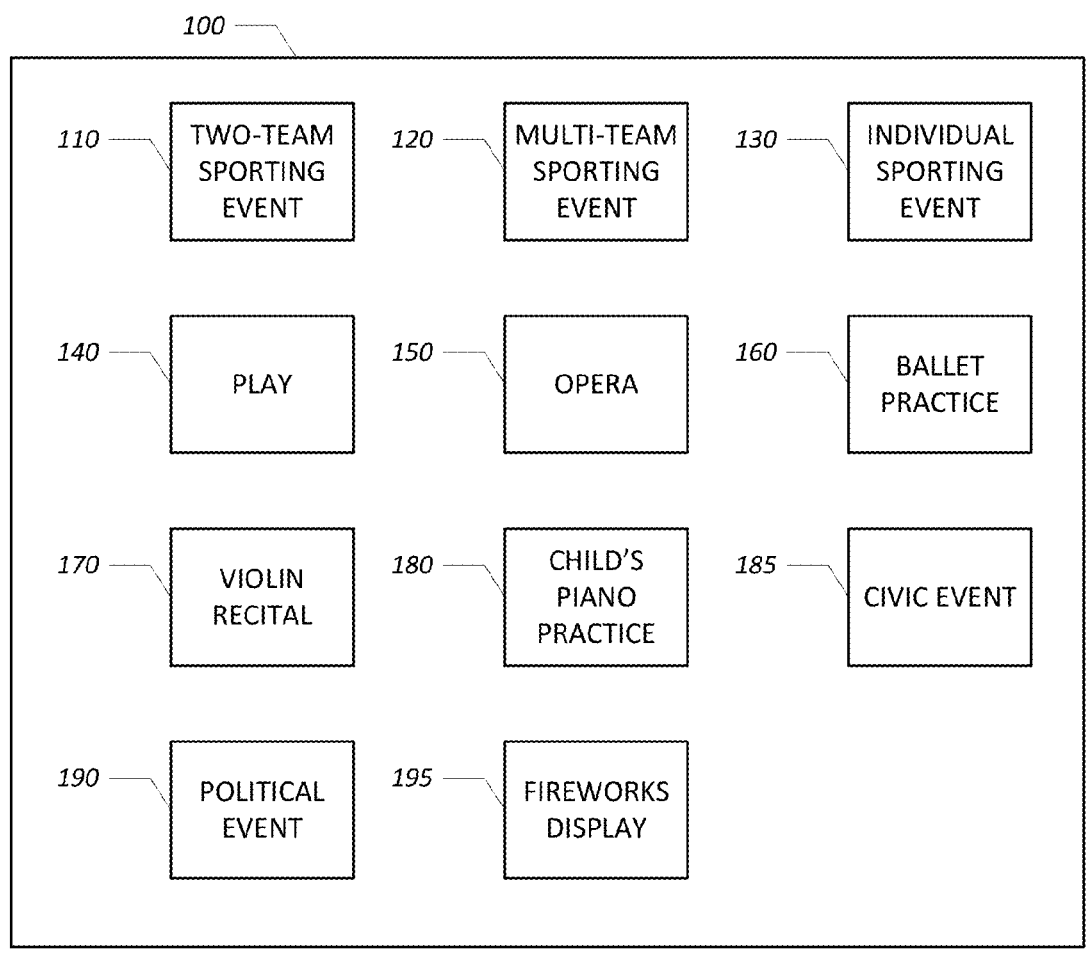
FIG. 1 shows exemplary types of events for which a FNS might be provided.

This description provides embodiments intended as exemplary applications of the inventive concept. The reader of ordinary skill in the art will realize that the invention has broader scope than the particular examples described here.

In this description and claims, the word "store" means store in tangible nontransitory computer-readable storage. By "storage" we mean tangible nontransitory computer-readable storage. By "download", we mean download from a remote system using a wireless communication system; the communication system might be the Internet or some other system or combination of systems. By "data", we mean information stored in, or accessed from, storage. By "database", we mean a collection of data that are somehow interrelated. By the word "or" we mean "inclusive or", unless it is clear from the context that "exclusive or" is intended; so "A or B" means A, B, or A and B.

Some of the drawings are flowcharts. The flowcharts are merely illustrative of processes. Within the scope of the invention, the order of steps in a flowchart may be changed; steps may be omitted; different but similar or equivalent steps or groups of steps may be performed; or other steps may be added.

Reference numerals are keyed to the figure of first appearance of the item to which they refer. So, for example, item 1200 appears in FIG. 12, and item 800 appears in FIG. 8.

FIG. 1 shows exemplary types of events 100 for which a FNS 300 might be implemented. These include a two-team sporting event 110, a multi-team sporting event 120, an individual sporting event 130, a play 140, an opera 150, a ballet practice 160, a violin recital 170, a child's piano practice 180, a civic event 185, a political event 190, and a fireworks display 195. At a baseball event, the baseball game itself can be regarded as a performance 1100; a pre-game show might optionally be regarded as part of the same performance 1100, or as a separate performance 1100. Often a single performance 1100 is the focus of an event 100—what the fans came to observe or experience. But an event 100 may include one or more performances 1100; events 100 themselves may be hierarchical, with an event 100 including other events 100.

Figure 2:
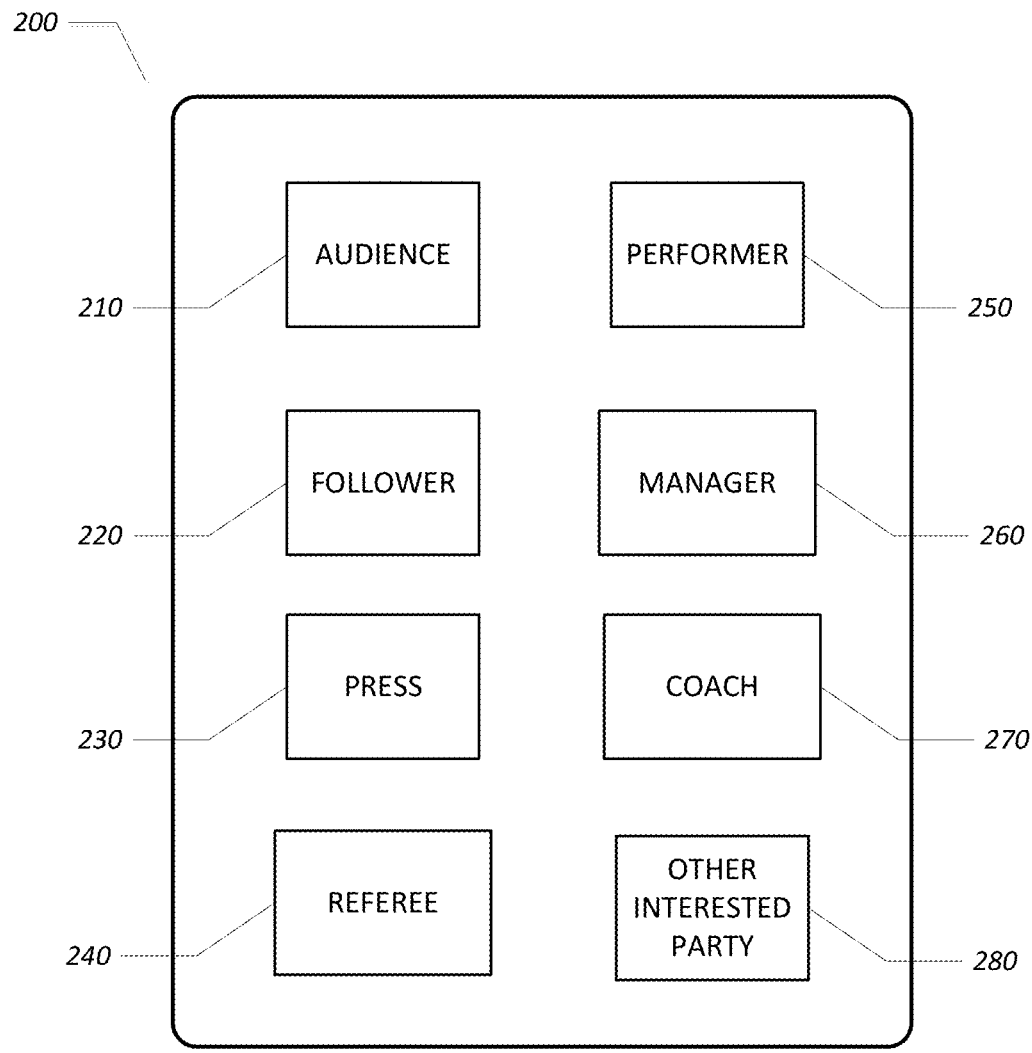
FIG. 2 is a conceptual diagram that illustrates exemplary types of fans (interested parties).

A fan 200 is an individual or organization that is interested in an event 100 or in a performer or artist, such as a band or a team. We will refer to any such interested party as a fan 200, even in contexts, such as those shown in FIG. 1 other than sporting events 100. FIG. 2 shows various types of fans 200, including: the audience 210; a follower 220; the press 230; a referee 240, such as a baseball umpire; a performer 250; a coach 270; a manager 260; or other interested party 280.

Figure 3:
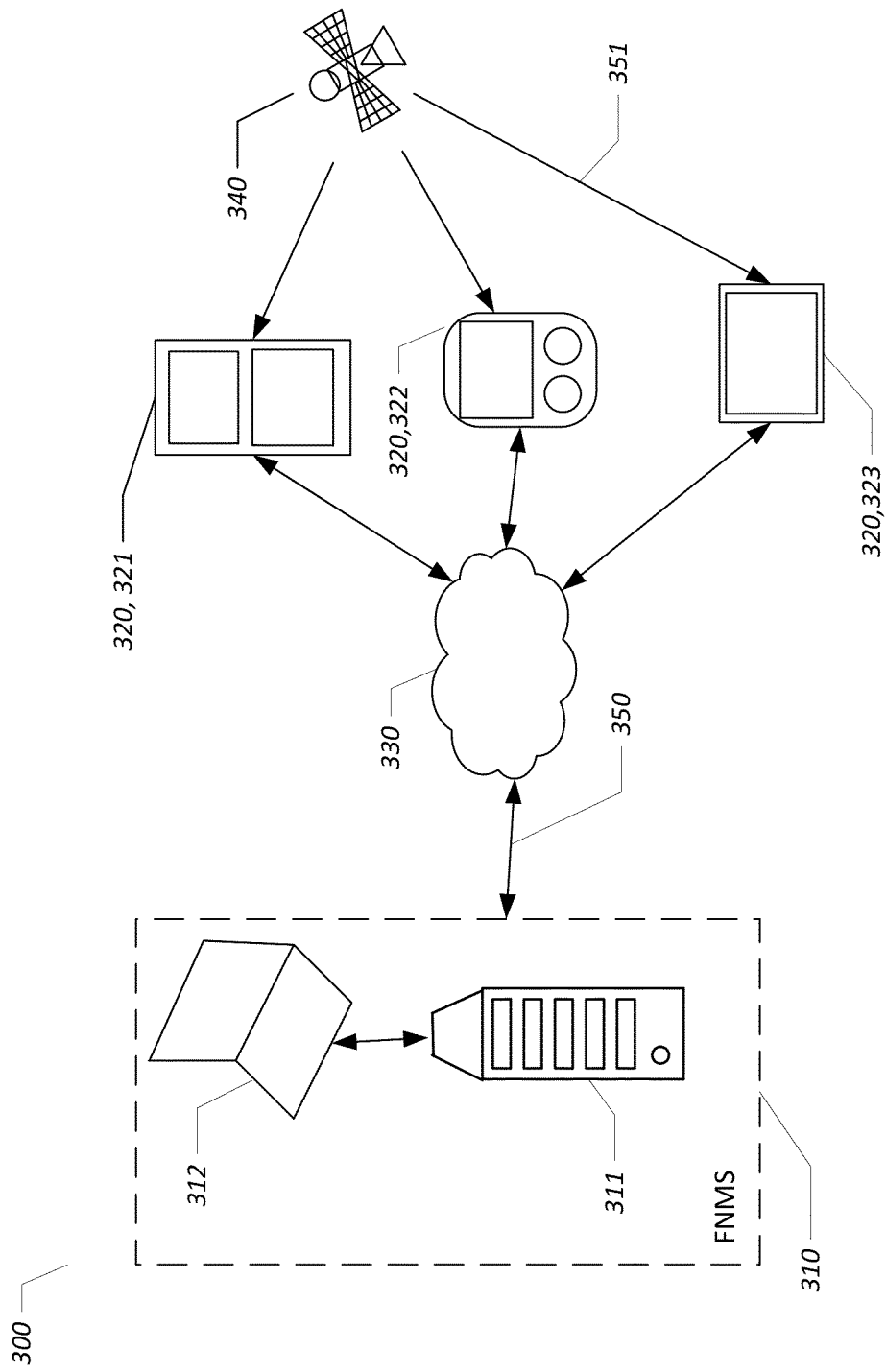
FIG. 3 is a conceptual diagram illustrating communication among components of an FNS, including a PSD, which executes a FNA, and a FNMS.
Figure 15:
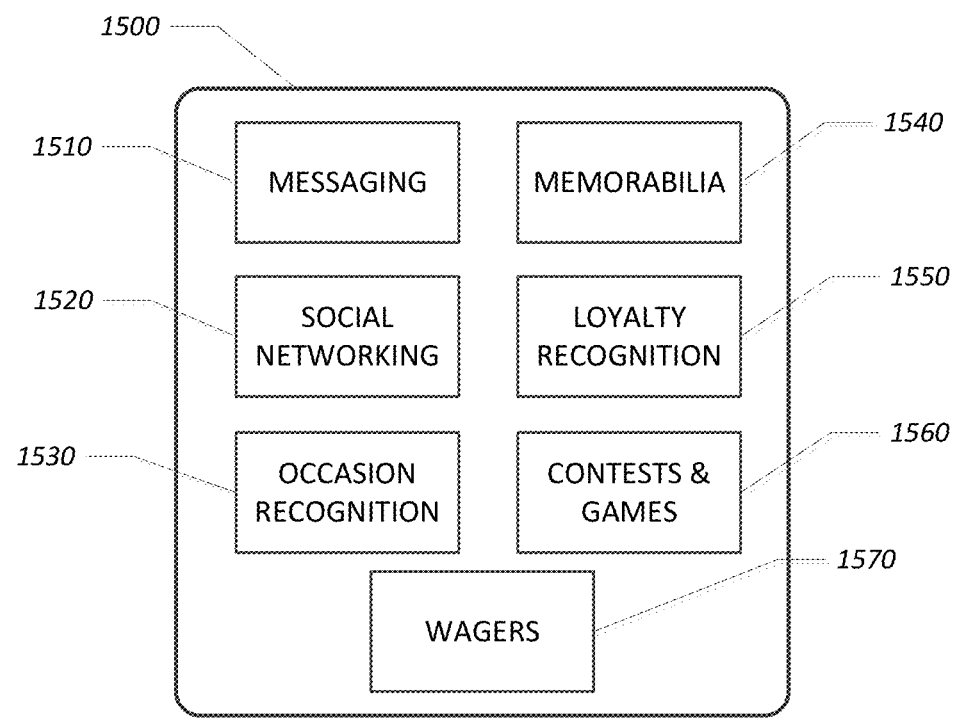
FIG. 15 is a conceptual diagram that illustrates exemplary categories of event networking services that might be provided by a FNS to fans, with the types of functionality available to a fan depending upon their current state relative to an event.

An event networking service (ENS) 1500 is a service, such as the exemplary ones shown in FIG. 15, provided by a FNS 300 to registered fans 200 at one or more events 100. The FNS 300 is implemented collaboratively between a fan networking management system (FNMS) 310 and the PSDs 320 of fans 200. FIG. 3 is a conceptual diagram illustrating communication among components of an FNS 300. The FNMS 310 might include any kind of hardware and software appropriate for carrying out its functionality. For example, the FNMS 310 might include a server 311 and a computer 312 providing a user interface (UI) 445 for management of the FNS 300; i.e., a management UI 450. Examples of types of PSD 320 include a cellular phone 321, a portable media player 322, and a tablet computer 323 or e-reader. FNMS 310 configuration is discussed in more detail in FIG. 3; PSD 320 configuration, in FIG. 5.

Communication occurs over a communication system 330. The communication system 330 might include a wide-area network such as the Internet, a local network, or a personal network. The communication system 330 may include any kind(s) of hardware of software, and may use any forms of communication protocol(s). A combination of communication systems 330 is itself a communication system 330. Double-headed arrows, as typified by arrow 350, indicate the possibility of two-way communication. Single-headed arrows, typified by arrow 351 indicate one-way communication. In particular, GPS satellites 340 transmit microwave signals that the PSD 320 receives and uses to determine its own location. Other geolocation technology might be used alternatively or in addition, such as beacons and cell phone towers. The communication system 330 connects an instance of a FNA 510 running on participating PSDs 320 with the FNMS 310. The FNA 510 might also facilitate direct communications between PSDs 320 of fans 200, taking advantage of, for example, BLUETOOTH® or WiFi that might be available in a PSD 320. See, e.g., FIG. 21 and associated text.

Figure 4:
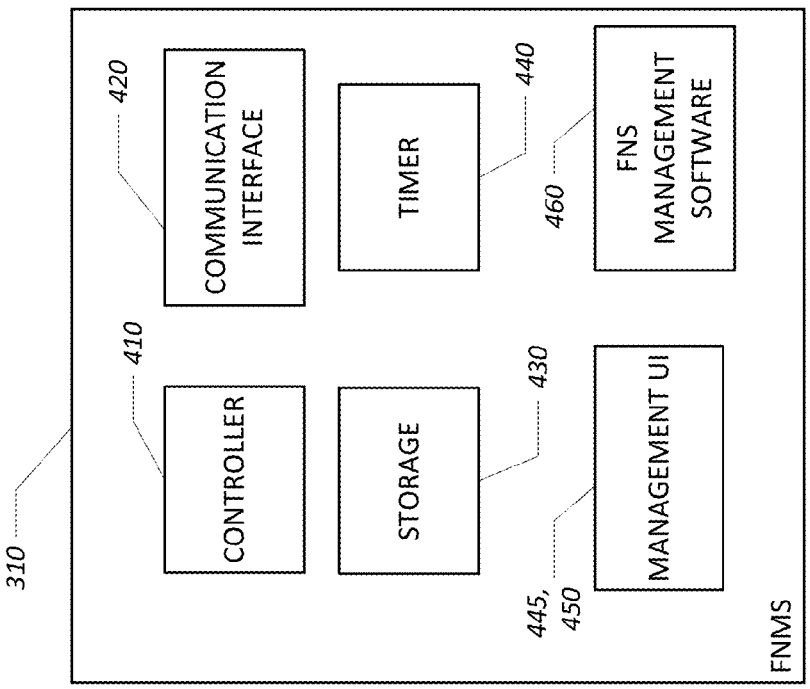
FIG. 4 is a block diagram illustrating a FNMS.

FIG. 4 is a block diagram illustrating a FNMS 310. Except for the FNMS software 460, all components in the figure may include hardware. FNMS 310 provides ENSs 1500 to fans 200 through their PSDs 320. A FNMS 310 may be remote from most or all of the PSDs 320. FNMS 310 execute logic, including FNMS software 460, possibly on one or more servers 311. FNMS 310 may include a controller 410, which includes a processor, that runs the automated portions of FNMS 310, and interacts with staff managing FNMS 310 through a management UI 450.

Figure 27:
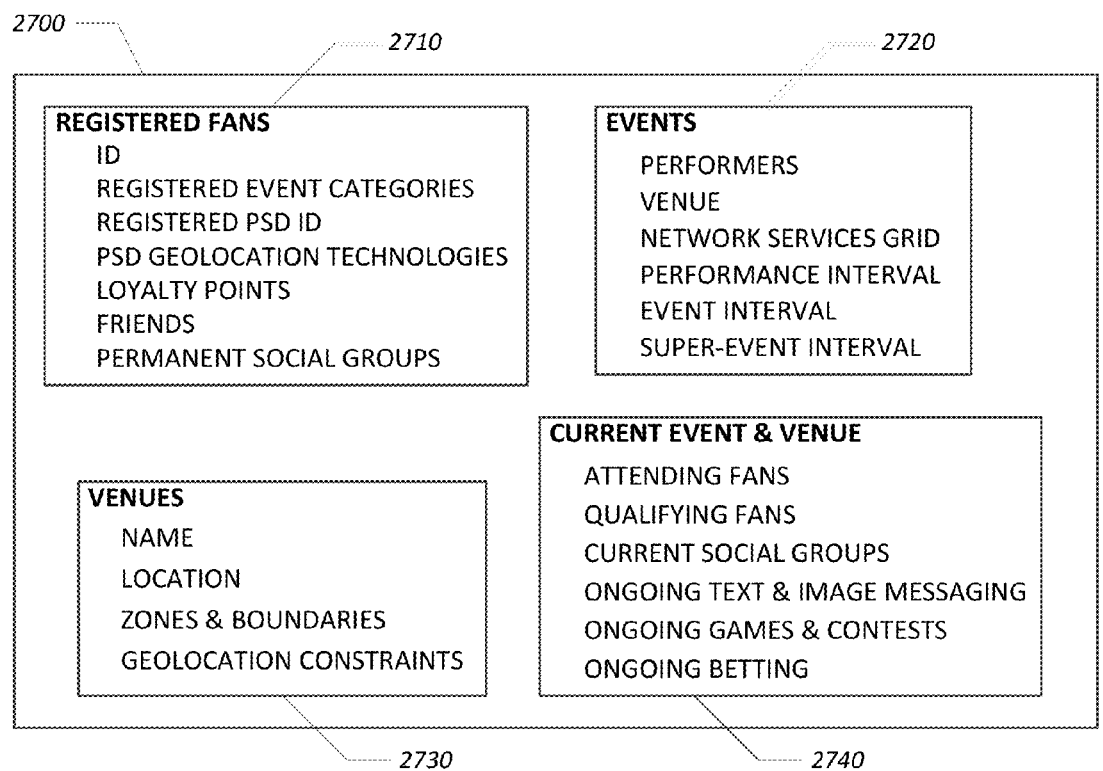
FIG. 27 illustrates exemplary kinds of data that might be maintained by a FNMS.

Logic of FNMS 310 facilitates or provides interaction among PSDs 320, as well as other networking services 1600 described herein. FNMS 310 may register fans 200; schedule events 100; organize games and contests; advertise; sell goods and services; provide propositions of outcomes for betting; or manage a prediction market. Ongoing human management, interacting with controller 410, may be required as types and details of ENSs 1500 may need to respond to evolution of an event 100. The management UI 450 allows the event 100 management to do whatever is necessary to run a FNS 300. The FNMS 310 includes storage 430, which may include FNMS software 460 and data accessed by the controller 410 in executing software instructions. The storage 430 might also include data received from, or to be sent to, any of the types of fans 200 shown in FIG. 2. The storage 430 might include any databases regarding any of the information described in relation to FIG. 8-23. FIG. 27 illustrates kinds of information that might be included in storage 430. Alternatively, some or all of this data, especially data pertaining to an individual fan 200, might reside on their PSD 320. Information sharing among FNAs 510 of attending fans 200 will be facilitated by the FNMS 310. FNMS 310 may include a timer 440. A number of timing tasks and timing needs are described in connection with FIG. 11-14, some or all of which might utilize the timer 440. FNMS 310 has a communication interface 420 to interact with the PSDs 320 of fans 200.

Note that logic of a FNS 300, in the form of hardware, or software instructions executing on hardware, may be divided in various ways between PSDs 320 of fans 200 and FNMS 310. For example, some or all of the timing tasks might be carried out on the PSDs 320 rather than by timer 440 and controller 410. Any workable division of FNS 300 logic is within the inventive scope.

Figure 5:
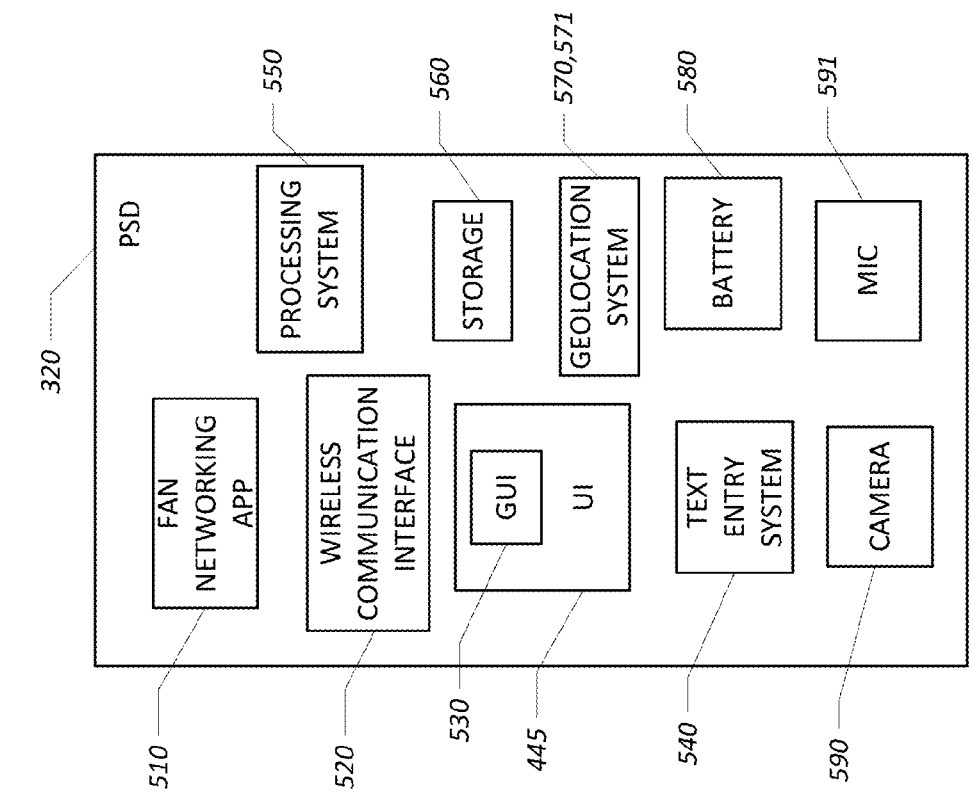
FIG. 5 is a block diagram that illustrates exemplary components of a PSD that might be used to provide event networking services to a fan.

FIG. 5 is a block diagram that illustrates exemplary components of a PSD 320 that might facilitate fan 200 interaction with ENSs 1500 provided by the FNS 300. PSD 320 includes a processing system 550, which includes a processor that executes software FNA 510. FNA 510 might be installed on the PSD 320, e.g., by the manufacturer or vendor of the PSD 320 or by a cellular service provider. FNA 510 might be available for download to the PSD 320 from a website such as, for example, the APP STORE®, GOOGLE PLAY®, or from a site provided by FNMS 310. PSD 320 may include storage, which may contain software instructions of the FNA 510, and data. The data might, for example, be data required or used by FNA 510; or by a FNMS 310, or it might be images, video, or other computer-readable content that fan 200 might at some point choose to upload to, or has downloaded from, FNS 300. FNS 300 may allow fans 200 to share such content with other fans 200. A photo might be used to customize a product, as described in reference to FIG. 18. PSD 320 has a UI 445, which may include a graphical user interface (GUI) 530. UI 445 allows fan 200 to take advantage of FNS 300 services and social interactions, such as those described in relation to FIG. 15-23. Text entry might be done through a touch screen or some other form of text entry system 540, such as a keyboard; there may be other tactile controls as well included in the UI 445. PSD 320 may have a camera 590 for taking still photographs and videos. It may have a microphone (mic) 591, for making audio recordings. PSD 320 may have other sensors (not shown), such as a thermometer, that might provide sharable data. PSD 320 may include a geolocation system 570 (e.g., a GPS 571 receiver), allowing PSD 320 to determine its location from satellite transmissions, or other hardware or software to facilitate geolocation of PSD 320. Interaction with FNS 300, including interaction with FNMS 310 (e.g., transmission of the location of PSD 320; registration of PSD 320 with one or more FNSs 300; and qualifying as attending event 100); and with other fans 200, may be accomplished through one or more wireless communication interfaces 520, such as cellular, BLUETOOTH®, or WiFi.

Figure 6:
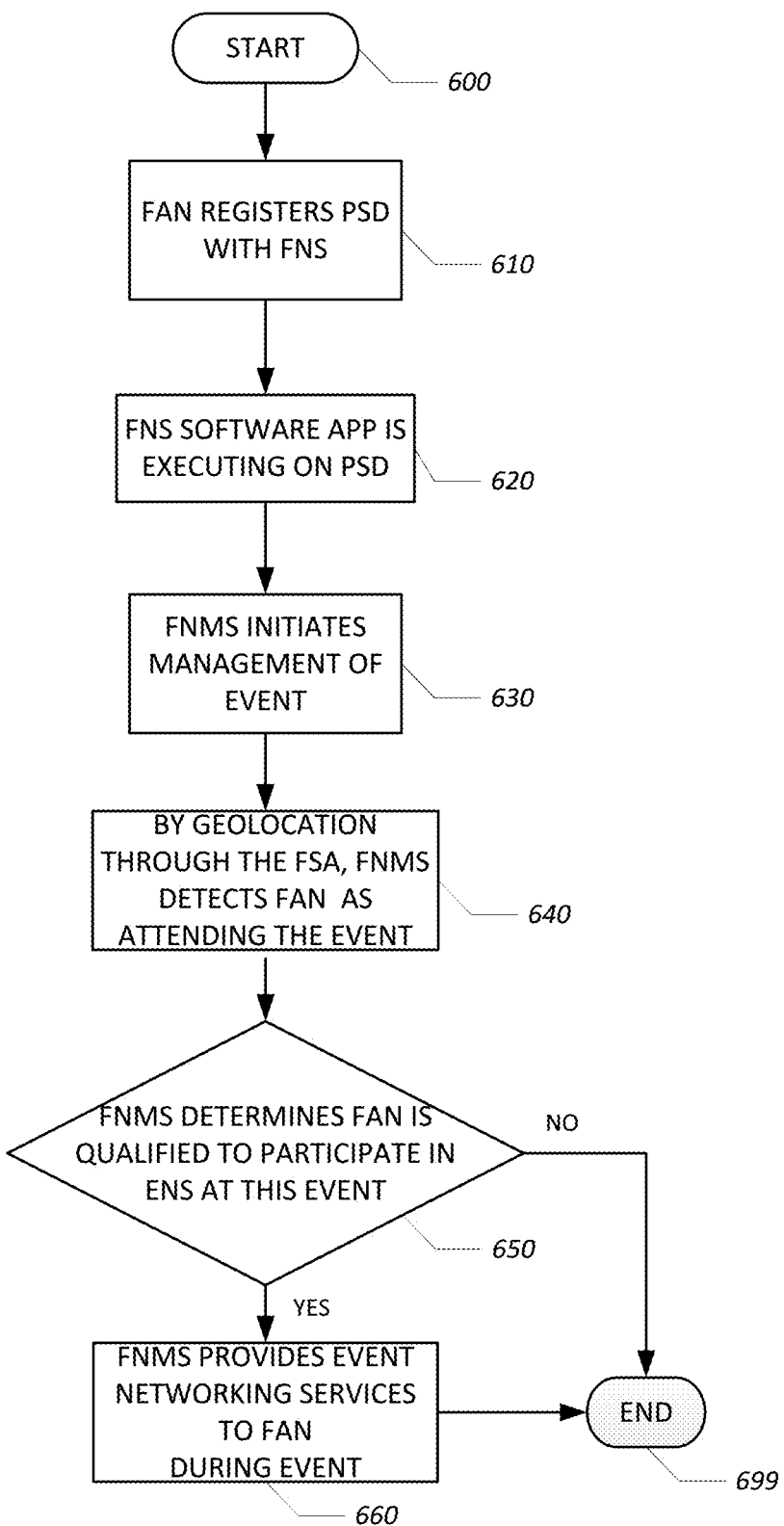
FIG. 6 illustrates an embodiment of a process whereby a FNMS provides, and a fan receives, ENSs.

FIG. 6 illustrates an embodiment of a process whereby a FNMS 310 provides, and a fan 200 receives, ENSs 1500 during an event 100. After the start 600, fan 200 registers 620 their PSD 320 with FNMS 310 to participate in the FNS 300 at the event 100. FNA 510 is executing 630 on a powered-on PSD 320. For example, the FNA 510 might be configured to execute whenever the PSD 320 boots up, or the user might initiate execution of the FNA 510. The FNMS 310 initiates management 640 of event 100 and initiates ENS 1500. Using geolocation, FNA 510 tracks PSD; the tracking data is transmitted by PSD 320, and received by FNMS 310. Using the tracking data, FNMS 310 detects 640 that the fan 200 is attending the event 100. If 650 the FNMS 310 determines that fan 200 is qualified to participate in ENS 1500 at this event 100, then FNMS 310 provides 660 ongoing ENSs 1500 through PSD 320 of fan 200 during event 100. The process ends 699.

Figure 7:
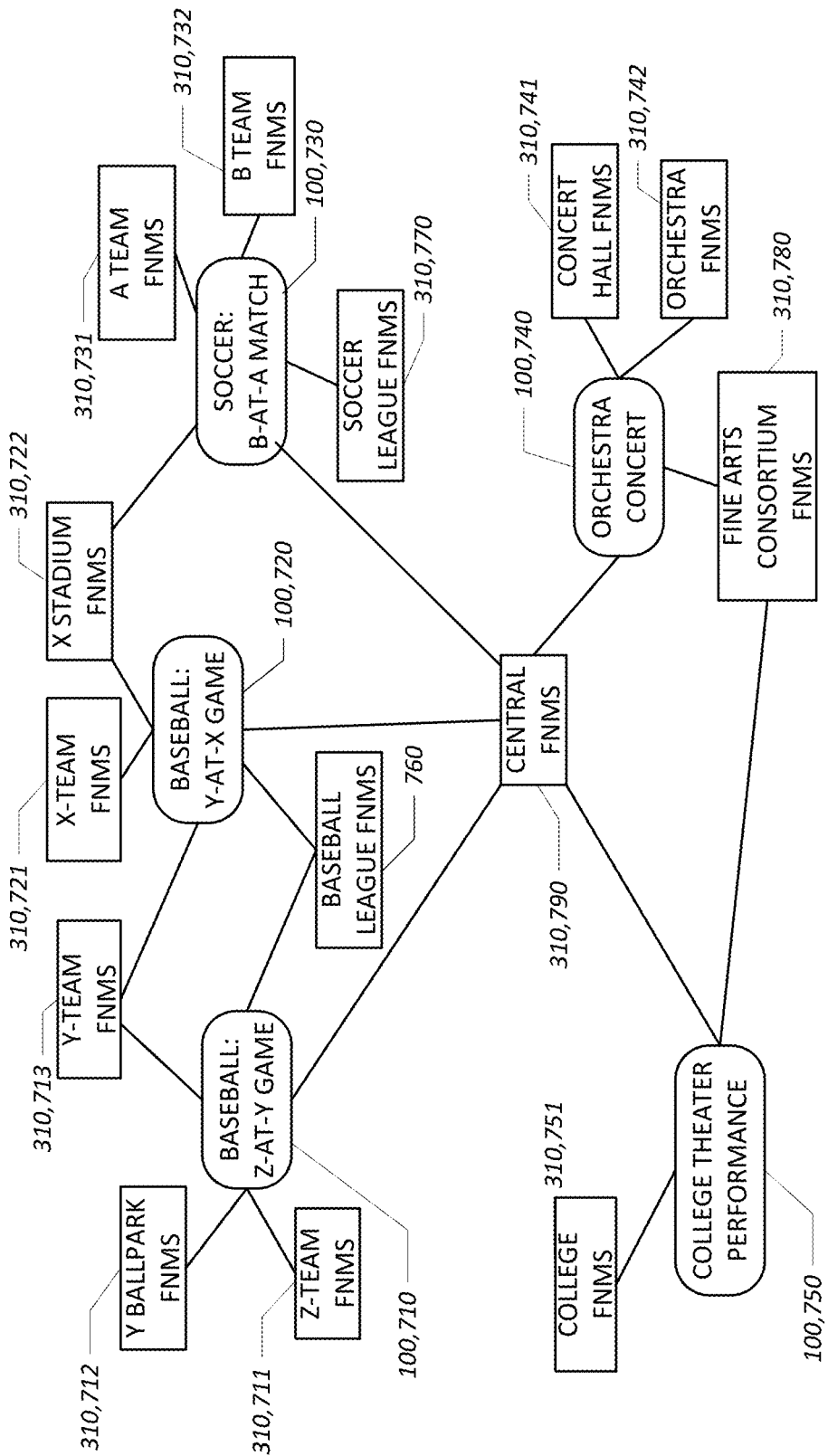
FIG. 7 illustrates various possible levels of FNMSs that might provide fan networking services to a variety of exemplary events or performances.

FIG. 7 illustrates that a FNMS 310 might be organized at any of a variety of levels. Some exemplary events 100 are shown in rounded rectangles. The events 100 include two baseball games, team Z playing at Y's ballpark 710 ("Z-at-Y game") and team Y at X's stadium 720 ("Y-at-X game"); a soccer match, team B at A 730 ("B-at-A match"), played at X's stadium; a concert 740 of orchestra M ("concert"); and college theater performance 750 ("play").

In FIG. 7, exemplary FNMSs 310 are shown in rectangles. A FNMS 310 might provide a FNS 300 at the level of an institution, team, or performer; for example, college FNMS 751; orchestra FNMS 742; Z-team FNMS 711; X-team FNMS 721; Y-team FNMS 713; A-team FNMS 731, and B-team FNMS 732. A FNMS 310 might provide FNS 300 at the level of a venue 800 where events 100 are held; for example, Y ballpark FNMS 712; X stadium FNMS 722; and concert hall FNMS 741. A FNMS 310 might provide a FNS 300 at the level of a league, consortium, or other group; for example, baseball league FNMS 760; soccer league FNMS 770; and fine arts consortium FNMS 780.

A line in FIG. 3, connecting an event 100 to a FNMS 310 indicates that FNMS 310 might provide ENSs 1500 at the event 100. There are several things to note. A given FNMS 310 might serve multiple individual events 100 or multiple types of events 100 (e.g., theater and soccer). A given event 100 might be served by a single FNMS 310, from any level, or by two or more FNMSs 310. These FNMSs 310 might offer ENSs 1500 to fans 200 through a common FNA 510, or independently through respective FNAs 510. A central FNMS 790 might serve multiple types of events 100, leagues, venues 800, and so forth. When multiple FNSs 300 serve a given event 100, each of them may provide different services and rewards to fans 200. For example, a central FNMS 790 might provide redeemable points for attending a variety of event 100 types, while a venue- or team-level FNMS 310 might offer services and incentives to encourage attendance at its own events 100.

A single FNA 510 executing on a user's portable electronic PSD 320 might connect with one or more FNMSs 310 for a single event 100. The FNA 510 maintains in storage 560 on the PSD 320 a list of the FNMSs 310 it is registered to access. Some of these FNMSs 310 may require a fee or fees for registration, and/or for access to ENS 1500 at particular events 100. The list of FNMSs 310 might evolve either automatically—e.g., an FNMS 310 might update the list of FNSs 300; or by user choice by, for example, by accessing a website, or through the UI of the FNA 510 itself. For any event 100 for which the PSD 320 is registered with a relevant FNMS 310, then the geolocation functionality will cause the FNA 510 to be placed into wireless communication with that FNS 300; or multiple FNSs 300. Two FNMSs 310 serving a single event 100 may offer ENSs 1500 through a single FNA 510, or independently through separate FNAs 510. In other words, FNMS 310 X may require FNA 510 A, while FNMS 310 Y requires B; or both X and Y may require A.

Figure 8:
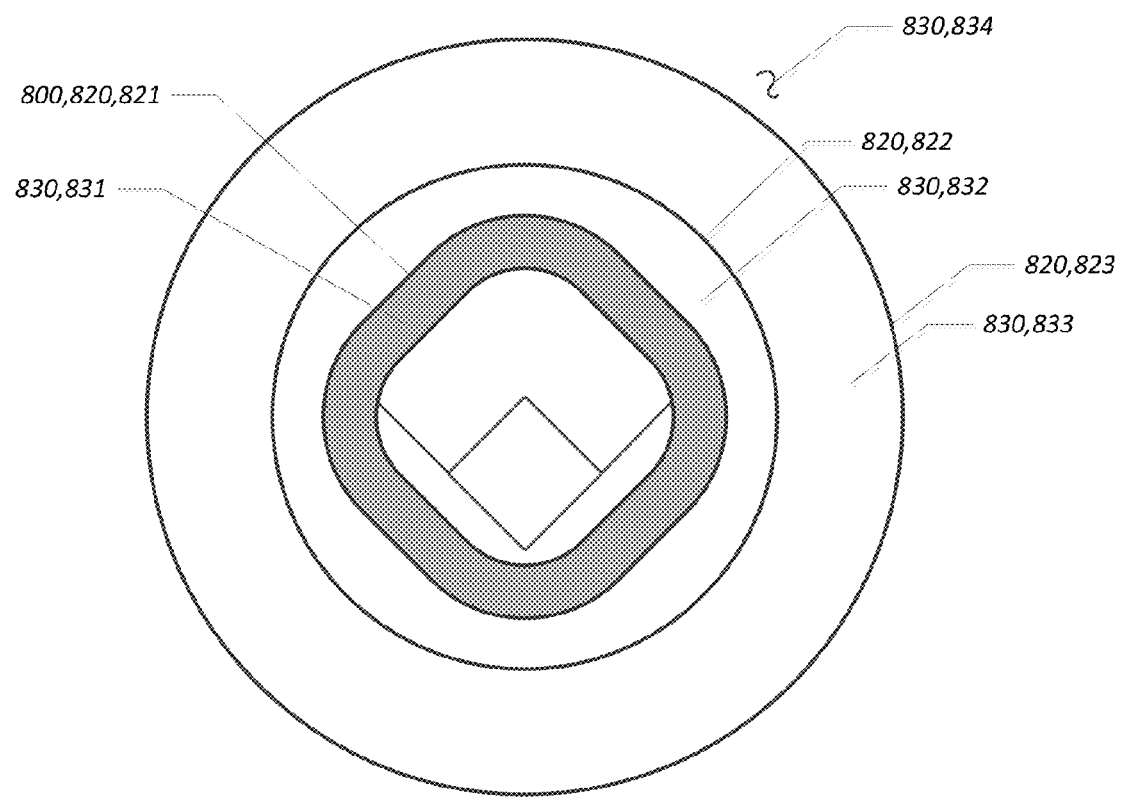
FIG. 8 illustrates an exemplary event venue, geofenced boundaries, and geofenced regions.

FIG. 8 shows venue 800 where a performance 1100 is held before an audience 210. The venue 800 of FIG. 8 is a ballpark, and the event 100 is a baseball game. A venue 800 might be, for example, a theater, a convention center, a classroom, an auditorium, a park, or any type of sports venue 800. A venue 800 may or may not include a building, such as a ballpark or concert hall. The venue 800 might be indoor, outdoor, or some combination thereof. The event 100 might be competitive, such as a football game, a debate, or a math competition; or noncompetitive, such as an orchestra concert or a musical.

As will be described in relation to FIGS. 11 and 13, the FNA 510 may use the geolocation functionality of a PSD 320 to determine a current state 1400, relative to the event 100, of a fan 200. The selection of ENSs 1500 provided to fans 200 in general, or to a particular fan 200, may depend upon such event/fan state 1400.

Taking full advantage of an FNS 300 might require extended use by the fan 200 of a FNA 510 throughout an event 100, and possibly even for some time afterward. Some steps can be taken to conserve battery 580 life in those PSDs 320 that offer both a HIRES and a LORES mode of geolocation service by reducing the level of geolocation resolution when feasible, consistent with the state 1400 of the fan 200 relative to the event 100.

FIG. 8 depicts an inner boundary (IB) 821, a middle boundary (MB) 822, and an outer boundary (OB) 823. These three boundaries 820 divide the horizontal space in the vicinity of the venue 800, a ballpark, into four layered zones 830: an inner zone (IZ) 831 or interior 831, a middle zone (MZ) 832, an outer zone 833, and an external zone 834 or exterior 834. Such zones 830 may be used in determining state 1400 of a fan 200, relative to the performance 1100, as that state 1400 evolves. The zones 830 might also be used to choose between LORES and HIRES geolocation technology, so as to extend battery 580 life.

In FIG. 8, the IB 821 is the boundary of the venue 800 itself (or something closely approximating that boundary), and the MB 822 and OB 823 are both circles. An IB 821 might, in some circumstances, be a closed figure that is entirely or partially inside the venue 800 boundary.

Admission to an event 100 often requires a fee, and even at free events 100, attendance in person is often encouraged by management. Because an FNS 300 provides valuable ENSs 1500 to attendees, IB 821 will preferably be chosen so that such services are not extended to people who are not entitled to receive them. Thus, if the venue 800 is a building, an IB 821 that closely tracks the boundary of the building may be preferable.

For some venues 800 and geolocation technologies, however, locating an IB 821 interior to a wall of a venue 800 might make detection of when a fan 200 has crossed into the IZ 831 impossible. For example, GPS tracking is unavailable in some buildings. Preferably, therefore, IB 821 will be at or beyond the boundary of the venue 800 itself, although in some embodiments, IB 821 might be a simpler shape (e.g., a circle or rectangle) than the exact boundary of a building, or MB 822 or OB 823 might have a less regular shape. However, for any given venue 800, a simple shape may be easier to implement, and yet be entirely adequate. Other forms of geolocation can be used instead of, or complementary to, GPS, when appropriate.

Figure 9:
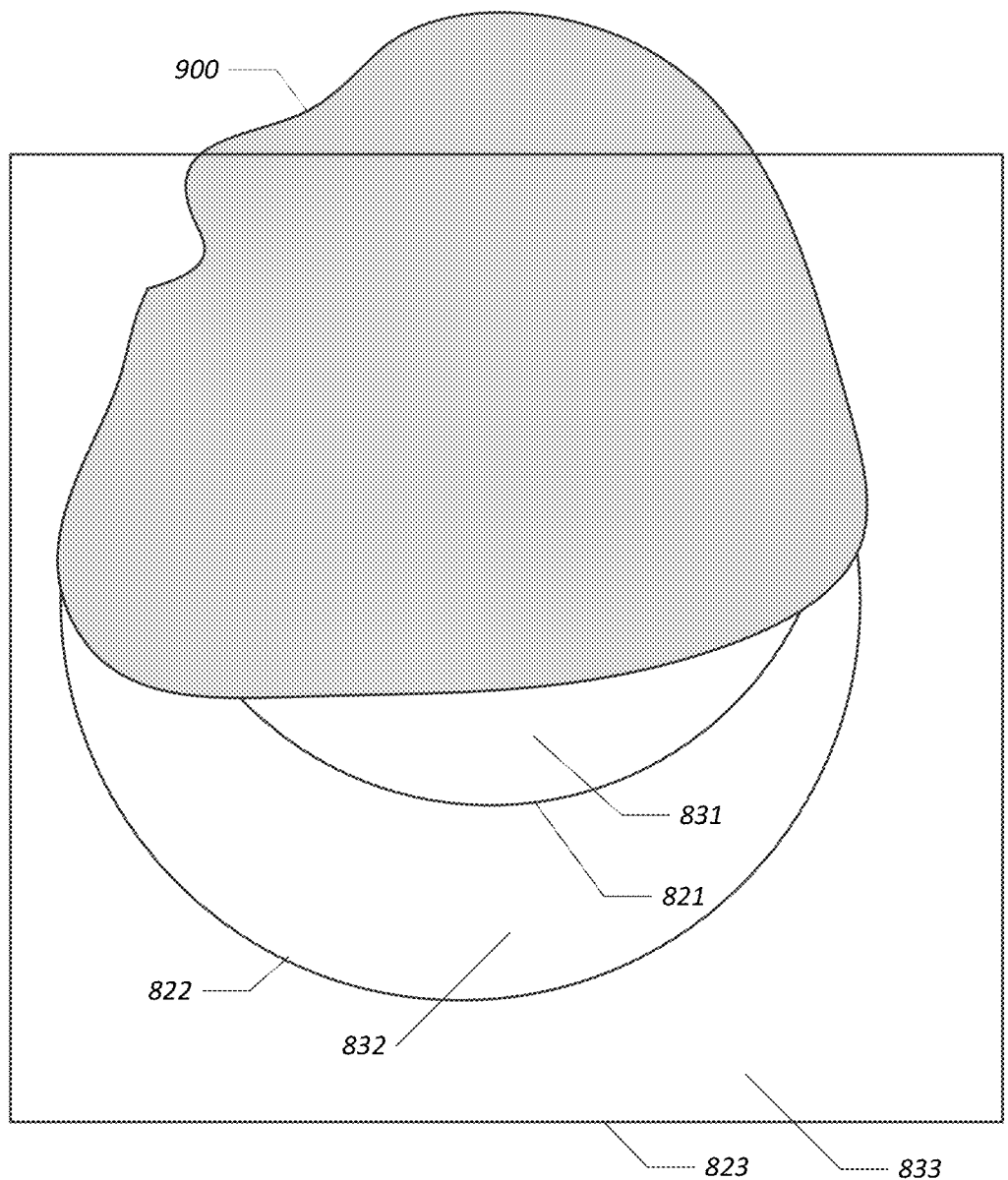
FIG. 9 illustrates another exemplary event venue, geofenced boundaries, and geofenced regions.

FIG. 9 shows a different venue 800 layout to illustrate generality of the zones 830 concept. The venue 800 in this example is a lake 900 over which a fireworks display will be held. The audience will observe from the IZ 831. Both IZ 831 and MZ 832 are bounded in part by the shore of lake 900. IZ 831 and MZ 832 are layered, but MZ 832 does not entirely surround IZ 831. The OB 823 is a square.

Layered zones 830 can be exploited to reduce the usage of the battery 580 of the PSD 320 required for geolocation, while providing HIRES tracking when needed to facilitate an IB 821 that is coincides with or closely approximates the boundary of the venue 800. PSD 320 is a proxy for the fan 200 who has registered the PSD 320 with a FNMS 310. Thus, if we say that a fan 200 is in some specified zone 830, strictly speaking we mean that the FNMS 310 has detected that the PSD 320, which is registered to the fan 200, is within that zone 830.

Figure 10:
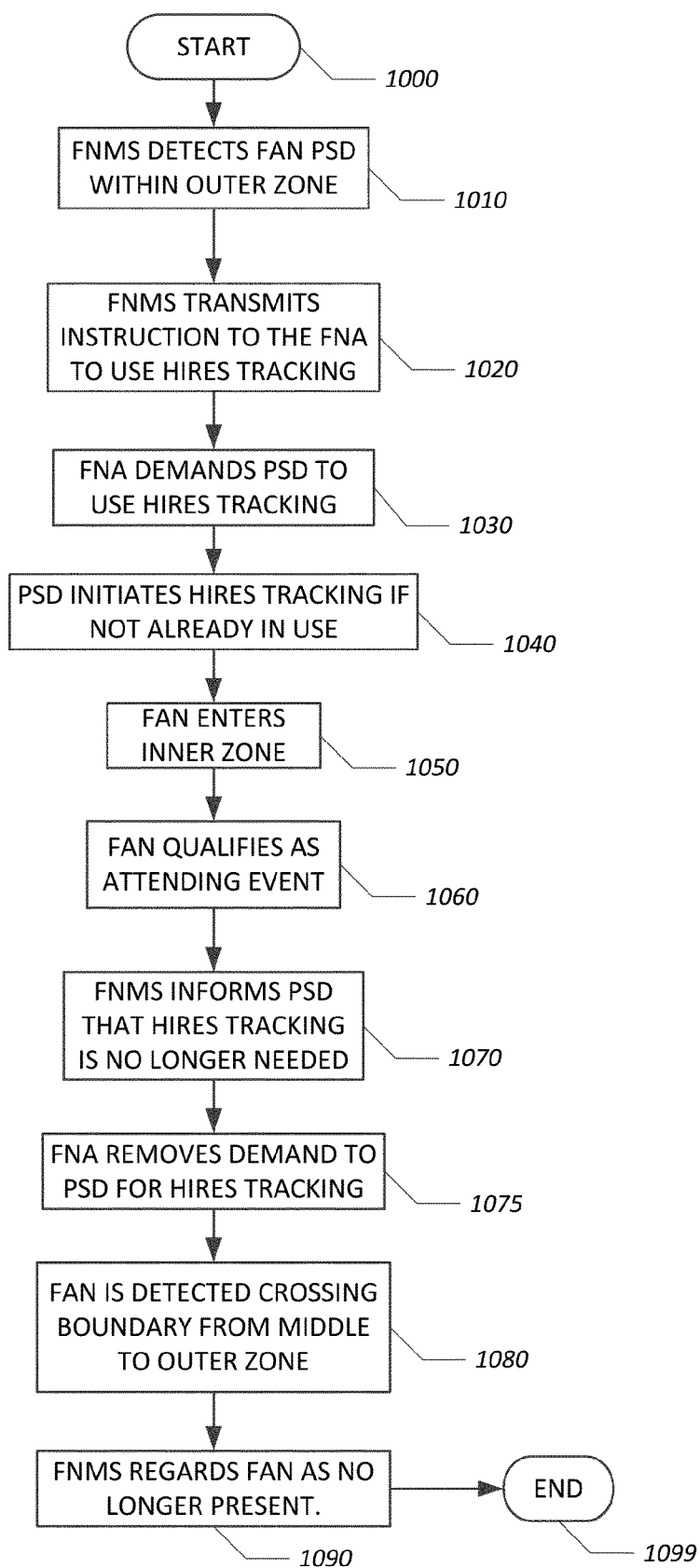
FIG. 10 is a flowchart that illustrates how zones might be used to reduce battery usage for geolocation, while avoiding providing networking services to people who have not qualified to receive them.

FIG. 10 is a flowchart that illustrates how zones 830 might be used to reduce battery 580 usage when GPS 571 is used for geolocation, while geographically limiting ENSs 1500 to only fans 200 who have qualified to receive them. After the start 1000, FNMS 310 detects 1010 that fan 200 is within OZ 833. Such detection will require that PSD 320 is powered on, and that FNA 510 is executing on PSD 320. FNMS 310 transmits 1020 an instruction to FNA 510 to use HIRES tracking. FNA 510 demands 1030 the geolocation system 570 of PSD 320 to use HIRES tracking. The geolocation system 570 initiates 1040 HIRES tracking if it is not in that mode already. Detection that fan 200 has crossed 1050 into IZ 831, and that fan 200 is remaining for a qualifying interval within IZ 831, is thus done with HIRES tracking, which can be quite precise. Once fan 200 qualifies 1060 as attending event 100 (which might require a fee to the FNMS 310, which the FNMS 310 might automatically charge against an account of the fan 200), FNMS 310 might choose to be more tolerant of imprecision in geolocation of that fan 200. FNMS 310 transmits 1070 an indication to PSD 320 that HIRES tracking is no longer needed. FNA 510, in turn, indicates 1075 to FNA 510 that it no longer needs HIRES tracking. If geolocation system 570 is not using HIRES tracking for some other PSD 320 purpose, it would ordinarily turn off HIRES tracking, conserving battery 580 life. At some later time, fan 200 is detected 1080 as crossing MB 822 into OZ 833 (or alternately, OZ 833 into EZ 834). At this point, FNMS 310 may regard 1090 the fan 200 as not present at event 100, and consequently may modify or reduce ENSs 1500 being offered to fan 200. The process ends 1099.

Of course, a FNMS 310 might want to vary ENSs 1500 at detailed locations within venue 800 itself—for example, in a ballpark, FNMS 310 might offer coupons 1955 to only restaurants nearby the fan's seat—then HIRES geolocation, and hence more detailed geolocation might be required throughout event 100 within the interior of the venue 800. Other aspects of the invention apply, regardless of whether layered zones 830 and/or switching between HIRES and LORES tracking are utilized at a given event 100 or by a given FNMS 310.

Commonly, a performance 1100 is embedded in an event 100. Of course, FNMS 310 has discretion in what it treats as a performance 1100, and what it treats as an event 100 for purposes of selecting ENSs 1500. FIG. 11 is a timeline depicting occurrences delineating a performance 1100, an event 100, and the duration of a super-event 1110, during which ENSs 1500 are provided for fans who qualified "attending". The performance 1100 is embedded within the larger event 100. The event 100 starts 1120 before the start 1150 of the performance 1100. From the viewpoint of FNMS 310, and usually the expectations of the audience 210 as well, event 100 might be considered to begin when doors of the venue 800 open, and end when the doors close. For example, at a ballgame, the event 100 might include some pre-game or post-game activities. The performance 1100 might be regarded as lasting from the first pitch to the final out. At an opera event 100, coffee and cookies might be sold in the lobby before or after the performance 1100. At a concert, recordings of the performing artists might be sold to attendees after the end 1160 of the performance 1100, but before the end 1180 if the event 100. In any case, it takes time for an audience 210 to leave the venue 800.

Figure 11:
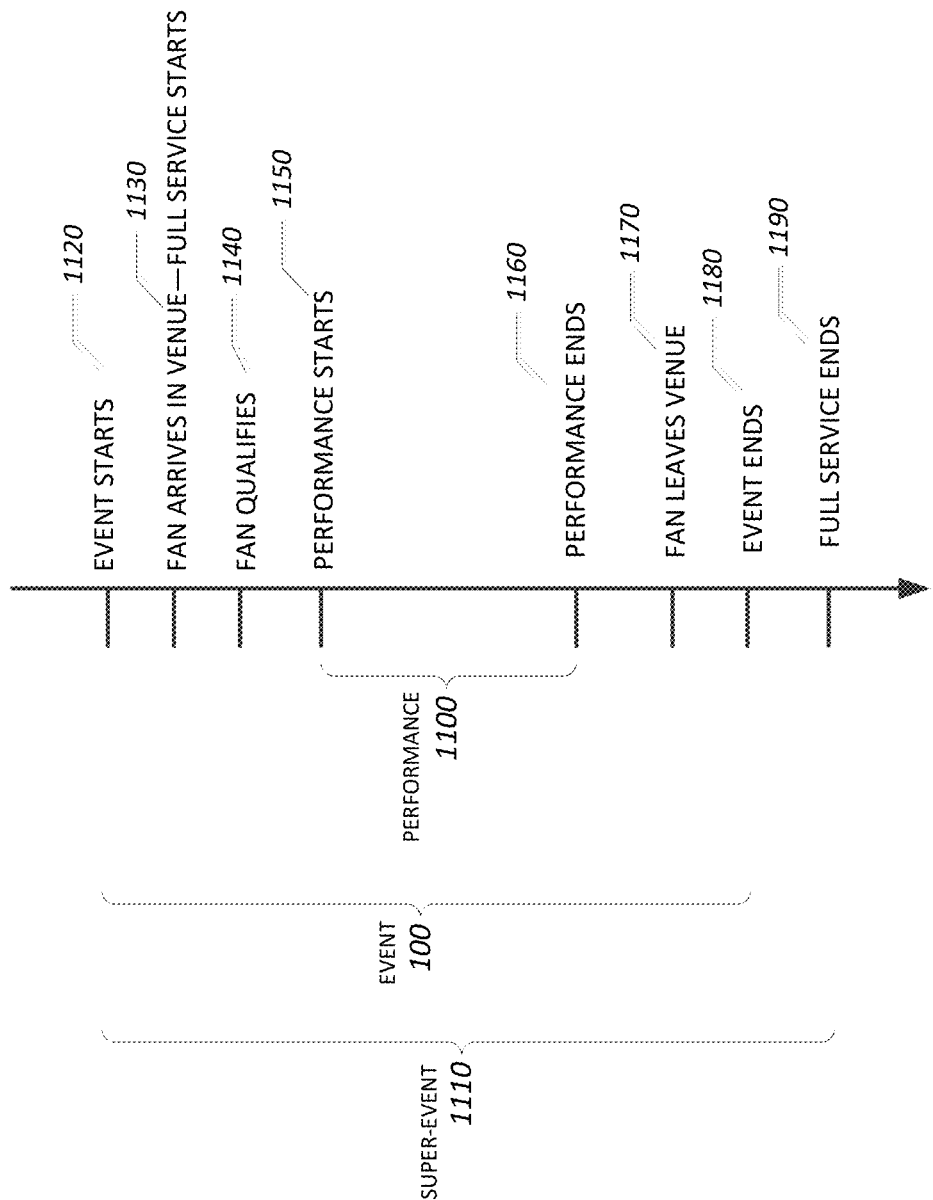
FIG. 11 is a timeline depicting exemplary occurrences that delineate a performance, an event, and a super-event; i.e., a duration of ENSs targeted to fans who are attending, or who attended the event.

Note that a timeline for an event 100 might be more complex than the exemplary one shown in FIG. 11. A state fair, for example, might run for several days. The state fair overall might be regarded as an event 100; each day might be regarded as a separate event; and each performance, display, amusement ride, or game within the fair on a given day might be regarded as a separate event 100. Similarly, a college football game might be preceded by a tailgating event surrounding the stadium, or at an adjacent location. The super-event 1110 might be regarded by the FNMS 310 as the combination of the tailgating and the game, each of which is treated as a separate event 100. Alternatively, the FNMS 310 might choose to regard the game as the only event 100, but change the boundaries 820 of zones 830 during the super-event 1110. The principles and methods of the invention extend to such situations, perhaps with a central FNMS 310 (e.g., the manager of the whole state fair) and other FNMSs 310 at the various subsidiary levels each determining whether to take advantage of a FNS 300 for their level of event 100. The Olympic Games are another example of a complex, hierarchical event. See FIG. 7. Preferably, in such situations all applicable ENSs 1500 will be offered to fans 200 through a single FNA 510. The selection of ENSs 1500 provided by the FNMS 310 may vary with factors including timing and location of performances, facilities such as stores and restaurants, and with the state 1400 of fans 200 relative to those factors.

As will be described in relation to FIGS. 14 and 15 the FNMS 310 may provide more or better ENSs 1500 to fans 200 who are detected to be actually attending the event 100. However, a FNS 300 might offer a limited selection of ENSs 1500 to some fans 200 who are not in attendance; e.g., fans 200 of a baseball team watching a game on television. We will refer to the level and variety of ENSs 1500 available to fans 200 during the event 100 itself as "full service". Note that "full service" does not imply that such fans 200 will receive an identical or a complete set of ENSs 1500. Based on location of the PSD 320, a process of qualifying, described in relation to FIG. 12, can be applied to make this determination of attendance. An effect of qualification for an exemplary scenario of possible state 1400 relative to an event 100, which includes a performance 1100, is shown in FIG. 11. Immediately upon arrival of the fan 200 inside the venue 800 after the start of the event 100, full service through the FNA 510 to the fan 200 begins. We will refer to the time interval when full service is available to fans 200 who qualified as attending as the super-event 1110. Assuming that the fan 200 does qualify 1140, full service may continue until, depending upon embodiment, either the performance 1100 ends 1160, the fan 200 leaves 1170 the venue 800, or the event 100 ends 1180. The preferred approach, however, is shown in the figure—

FNMS 310 will provide full service for a super-event 1110 which extends for some interval after the event 100 ends 1180. For example, full service for an afternoon baseball game might continue to be provided to fan 200 after the ballpark has closed for the day to the public, and after fan 200 has gone home. The length of the post-performance extension may depend upon the type of performance. An extension having any duration of 30 minutes to 6 hours might be appropriate for a baseball game.

In order to conserve battery 580 life, preferably, HIRES tracking will not be required until an inbound fan 200 crosses the OB 823 into the OZ 833. When the fan 200 crosses the OB 823 (or in some embodiments, the MB 822) in the other direction, then the HIRES requirement can be turned off. This might happen, for example, if a fan 200 enters the OZ 833, and then exits into the EZ 834 without entering the IZ 831.

A relatively large number of people who are registered as fans 200 with the FNMS 310 may enter the IZ 831 after the start 1120 of the event 100, but not remain for the performance 1100. Such a fan 200 might, for example, stop to buy a ticket for an upcoming event 100, or to drop off their child, or to make a delivery. To distinguish an attendee from a fan 200 who is, as it were, "just visiting", we want to know when someone leaves the venue 800 once the FNMS 310 demand for HIRES tracking has been removed. This can be done more or less satisfactorily by using LORES tracking to determine that the fan 200 has exited the MZ 832 into the OZ 833 by crossing the MB 822 (or, in some embodiments, OZ 833 into EZ 834 by crossing the OB 823).

Figure 12:
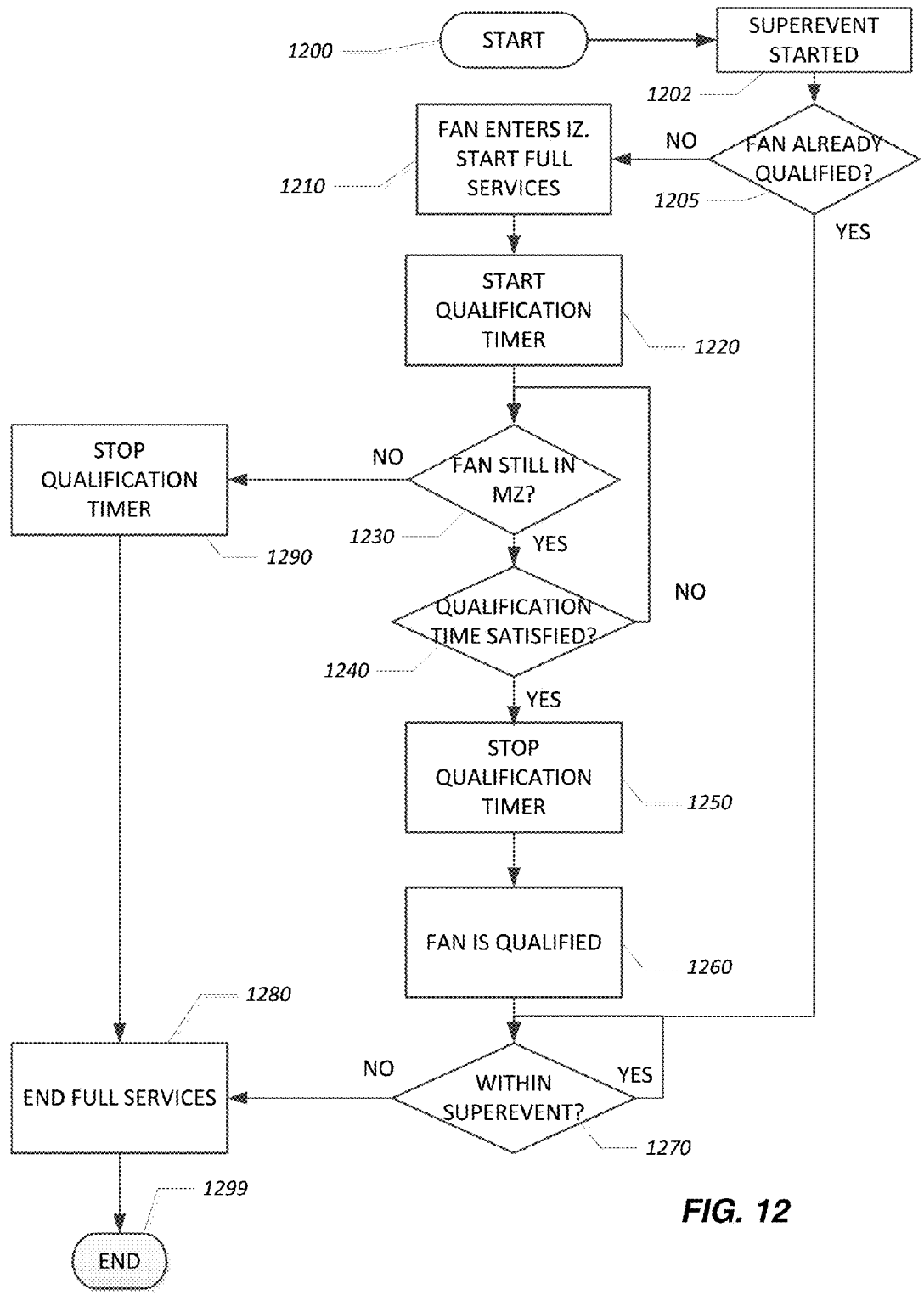
FIG. 12 is a flowchart that illustrates an exemplary process, which might be required by a FNMS, whereby a fan can qualify as attending an event.

As already mentioned, not everyone who is near, or temporarily inside, the venue 800 is necessarily attending the performance 1100. FIG. 12 is a flowchart that illustrates an exemplary process of qualifying a fan 200 to be considered as "attending" a performance 1100. The approach of FIG. 12 is to regard a fan 200 as attending if they enter the venue 800, and remain inside for some qualification time interval DT, for example, 10 min. At the start 1200 of the process, it is assumed that super-event 1110 has already begun 1202. If 1205 the fan 200 has already qualified, then the qualification steps can be skipped. Once the fan 200 enters 1210 the IZ 831, the FNMS 310 causes 1220 a timer 440 to be started; the timer 440 might be within the PSD 320, or within the FNMS 310. If 1230 the fan 200 leaves the MZ 832, as detected by step 1240, before interval DT has expired, then the timer 440 is stopped 1290, and full service ends 1280. The fan 200 has failed to qualify. Otherwise, if 1240 the fan 200 remains through interval DT, then the timer 440 is stopped 1250, and the fan 200 qualifies 1260 as attending the performance 1100. So long as super-event 1414 has not ended (see the loop at step 1270), the fan 200 continues to attend. Once the super-event 1414 period ends, full services end 1280. The process ends 1299. In some embodiment, additional steps might be required for qualification, such as paying a fee to the FNMS 310 through the FNA 510.

Note that some ENSs 1500 might be available to a registered fan 200 prior to qualification. For example, a fan 200 entering the vicinity of a ballpark might receive a banner photo and legend, e.g., "Welcome to Thunderbold Field", through their PSD 320.

FIG. 13 is a table 1300 that illustrates possible effects of timing and location of the PSD 320 upon monitoring level 1350 and state 1400 of the fan 200. Columns in the table 1300 fall into two categories, timing 1310 and device location 1320. The timing 1310 category includes columns that specify whether it is during the event 1311 and whether the fan 200 is qualified 1312 as attending. The device location 1320 category includes columns that specify whether the fan 200 is inside the OB 1321, inside the MB 1322, or inside the IS 1323. Rows in the table specify monitoring level 1350 (either no monitoring 1331, LORES monitoring 1332, or HIRES monitoring 1333), and whether the fan 200 is in the process of qualifying 1334, and whether they are regarded as actually present 1335. The state 1400 of being present 1335 might affect the types and level of services offered to them by the FNMS 310. Each cell in the table contains either the word "YES", as typified by the cell labeled 1341; "NO", as typified by the cell labeled 1342; or is empty, as typified by the cell labeled 1343. The header for a row represents an exemplary consequence of the Boolean statement formed by the column headers in combination with the contents of cells in that row. Empty cells are irrelevant. The resulting Boolean statements imply the following. When not during an event 100, no monitoring of fan 200 location is occurring. Otherwise, during an event 100, once a fan 200 has qualified as attending, LORES monitoring of the location of that fan 200 is done. When a fan 200 is inside the OB 823 and has not qualified as attending, then HIRES tracking of the fan 200 is done. This reduced monitoring level 1350 is particular implementation of a battery 580-conserving strategy. Once a fan is inside the IB 821, but has not qualified as attending, then the fan is in the process of qualifying. Once a fan 200 is qualified, and is within the IB 821, then the fan 200 is regarded as present 1335.

Figure 14:
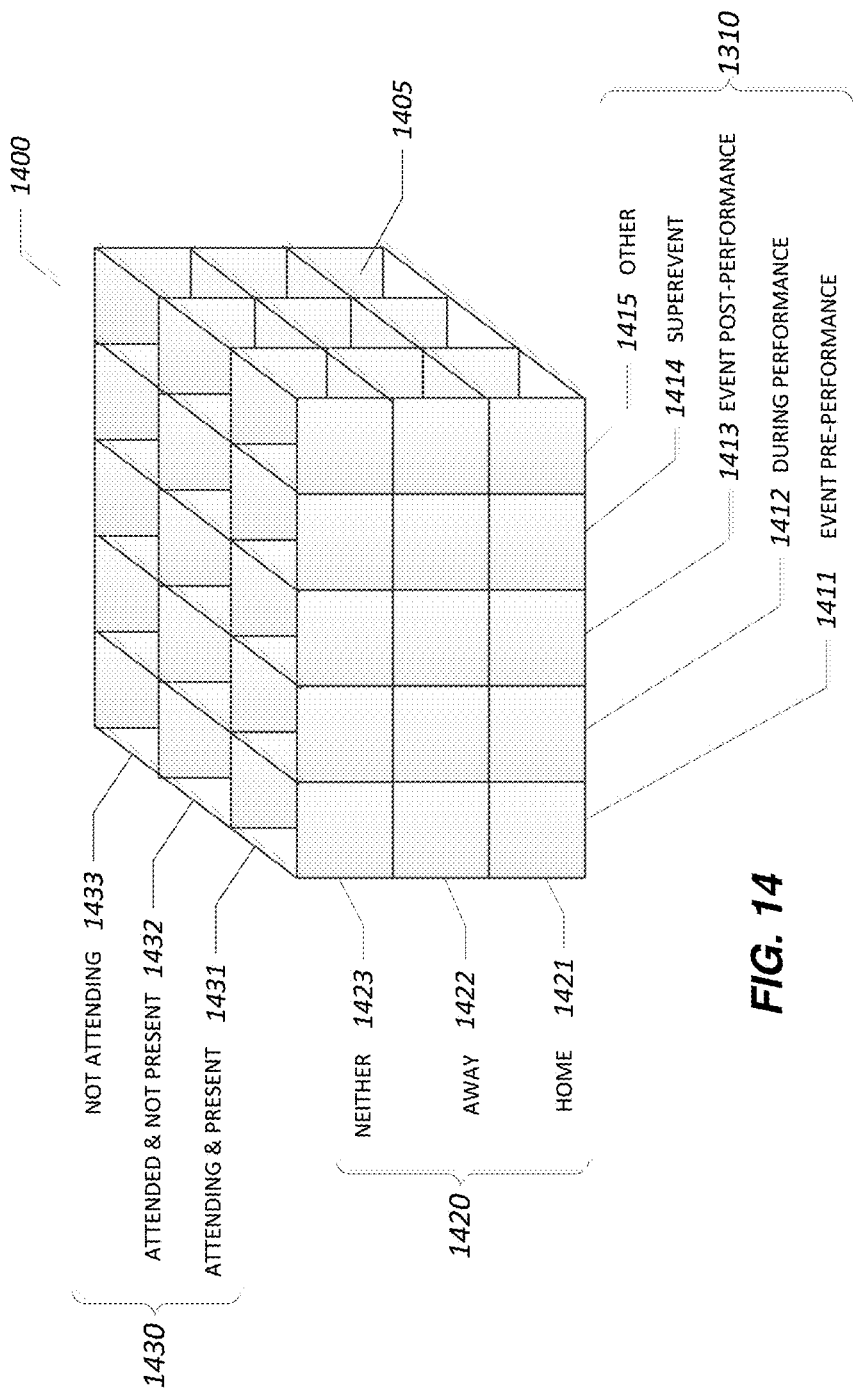
FIG. 14 is a conceptual diagram that illustrates exemplary factors which might be used to determine the "state" of a fan relative to an event, for selecting types and levels of functionality offered to them.
Figure 20:
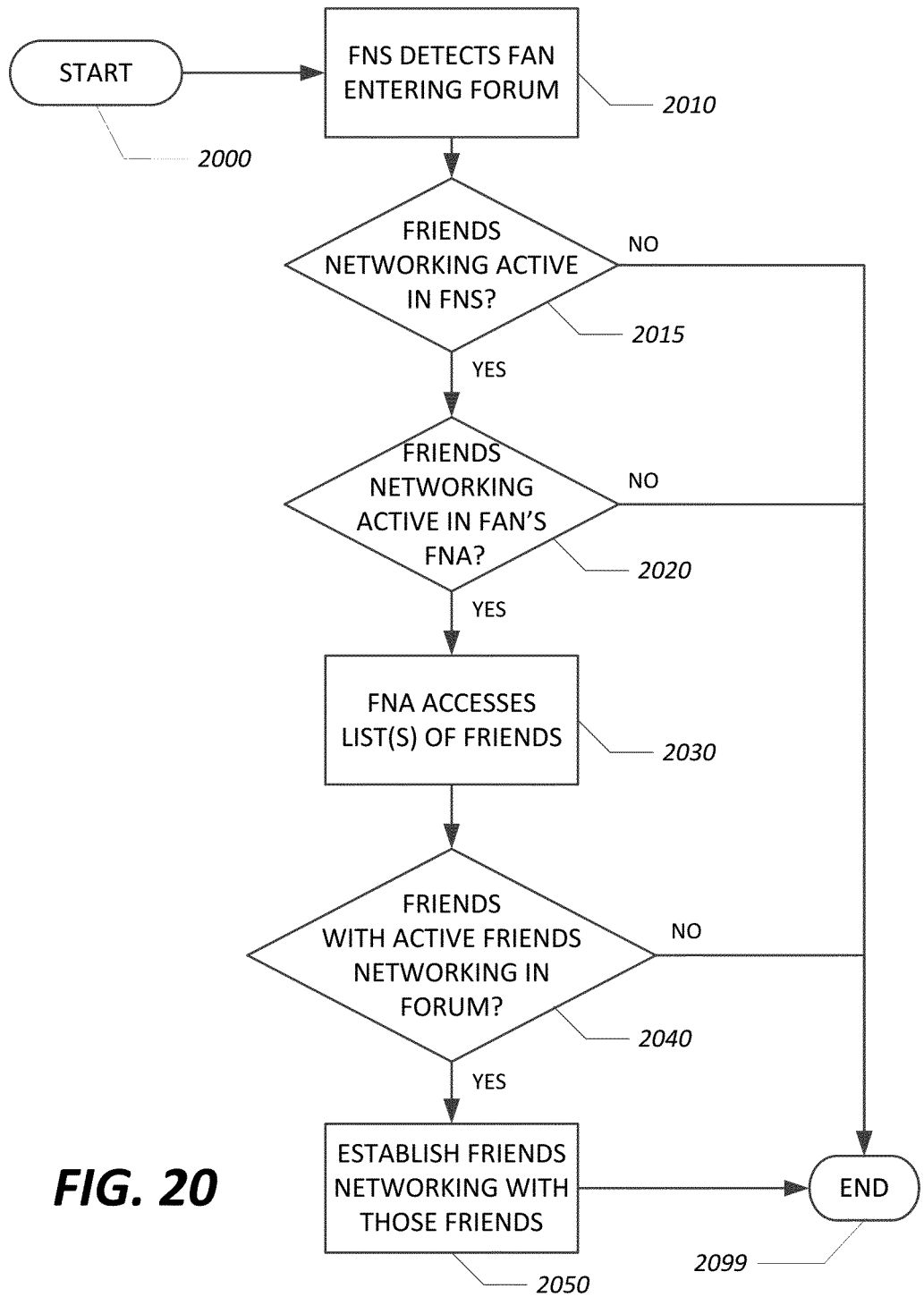
FIG. 20 is a flowchart that shows how social networking "friends" might be identified by, and interact through, a FNS.

FIG. 14 is a conceptual diagram that illustrates exemplary factors which might be used in some embodiments to determine a current state 1400 of a fan 200, in order to select types and levels of functionality offered to a fan 200 by the FNMS 310 through the FNA 510 on their PSD 320. In the baseball scenario, a coupon 1955 for a restaurant in the ballpark is appropriate during the performance 1412 for a fan 200 who is attending and present 1431. However, it would be inappropriate to offer that same fan 200 a free pom-pom in the home team's colors if the fan 200 chooses to affiliate with the away 1422 team. FIG. 14 uses three factors to determine state: timing 1310, attendance 1430, and team affiliation 1420. Depending upon embodiment, not all of these factors might be used in determining state 1400. For example, team affiliation is irrelevant for an orchestra concert. Other factors might be used in addition to those shown. For example, state 1400, which may be used to determine levels (e.g., value of a coupon 1955; probability of receiving a free gift) and types of services (see FIG. 15), might also be based upon fan 200 type, as illustrated by FIG. 2; or by "friends" relationships, as illustrated by FIG. 20.

The cells 1405 in FIG. 14, which correspond to states 1400 of fans 200 relative to an event 100, are shown empty for graphical convenience. However, for respective embodiments, each cell 1405 may correspond to a set of choices, made by FNMS 310, from among the kinds of exemplary ENSs 1500 shown in FIG. 15 and FIG. 16. For example, full service to a member of the audience 210 at a performance 1100 might include messaging 1510 among fans 200 and/or among "friends"; the ability to interact with, and possibly create, social groups of other fans 200 interested in the performance 1100; loyalty recognition 1550 for a fan 200 who may regularly attend performances 1100 of a certain type (e.g., games of a baseball team); and the opportunity to participate in contests. A given cell might correspond to any combination of services, from none at all, to full service (i.e., an enhanced set of services available to a fan 200 during the event 100 or thereafter). (Note that even at "full service", some variations in services offered to fans 200 may vary depending upon their spatial positions within the venue 800, or upon other factors.)

The state 1400 of a fan 200 relative to an event 100 can evolve over time. The timing 1310 factor of FIG. 14 is determined by how FNMS 310 chooses to run the event 100 including, for example, when they open and close doors of a venue 800 where the performance 1100 is held. The FNS 300 must know time points relevant to its operation. A time point might be manually entered to FNMS 310 through management UI 450 (e.g., we have just opened the doors); might be available to the FNMS 310 from a database in storage 430, possibly in a schedule or agenda previously entered through the management UI 450 (e.g., the performance 1100 will begin at 8 PM tomorrow); or obtained from one or more sensors (e.g., a sensor that detects that all the seats in an auditorium are now filled). In embodiments represented by FIG. 14, the timing 1310 factor can take on values of: within the event 100 but pre-performance 1411; during the performance 1412; within the event 100 but post-performance 1413; in the super-event 1414 (but outside the event 100), and other time 1415.

The attendance 1430 factor in FIG. 14 may be determined by logic and geographical tracking as described, for example, in relation to FIGS. 8, 12, and 13. In embodiments represented by FIG. 14, the attendance 1430 factor can take on values of attending and present 1431, attended and not present 1432, and not attending 1433. Note that one might have been attending and present 1431, even though the current time is, for example, post-performance 1413.

The affiliation 1420 factor in FIG. 14 might be entered by the fan 200 through the FNA 510. The affiliation 1420 might be set to a default value during registration of the fan 200 with the FNMS 310, or upon acquiring the FNA 510. The fan 200, again through the FNA 510, may be able to update the default, or override it temporarily for a particular performance 1100. In embodiments represented by FIG. 14, the affiliation 1420 factor can take on values of home 1421, away 1422, and neither 1423.

Note too that other factors not shown in FIG. 14 may also contribute to determining state of an event 100 and a fan 200, and hence the types and levels of functionality offered to fans 200 by the FNS 300 through the FNA 510. For example, a given Olympic Games includes many events 100, venues 800, organizations, and levels of management; and might well have many FNMSs 310. FIG. 11-14 are illustrative of fan state for more commonplace embodiments of the invention. The technologies discussed herein—e.g., FNA 510 on PSD 320; geolocation; battery optimization; rules defining event 100 state and fan 200 state relative to an event 100; fan 200 choice of interests or affiliation; and ENSs 1500 that depend upon event 100 state, fan 200 state, and fan 200 choices—can be applied in more complex situations.

FIG. 15 describes categories of ENSs 1500 that might be provided to fans 200 by a FNS 300, mostly through their PSD 320. The categories include messaging 1510, social networking 1520, occasion recognition 1530, memorabilia 1540, loyalty recognition 1550, contests and games 1560, and wagers 1570. For example, the FNS 300 might recognize a fan 200 for regular attendance at events 100 as an instance of loyalty recognition 1550. Through the FNS 300, a ballpark might post a birthday announcement on the scoreboard, possibly for a fee, as part of occasion recognition 1530. Any given service in any given category might be limited to fans 200 falling within a specific set of states 1400 from among all available states 1400, such as those depicted in FIG. 14.

Figure 16:
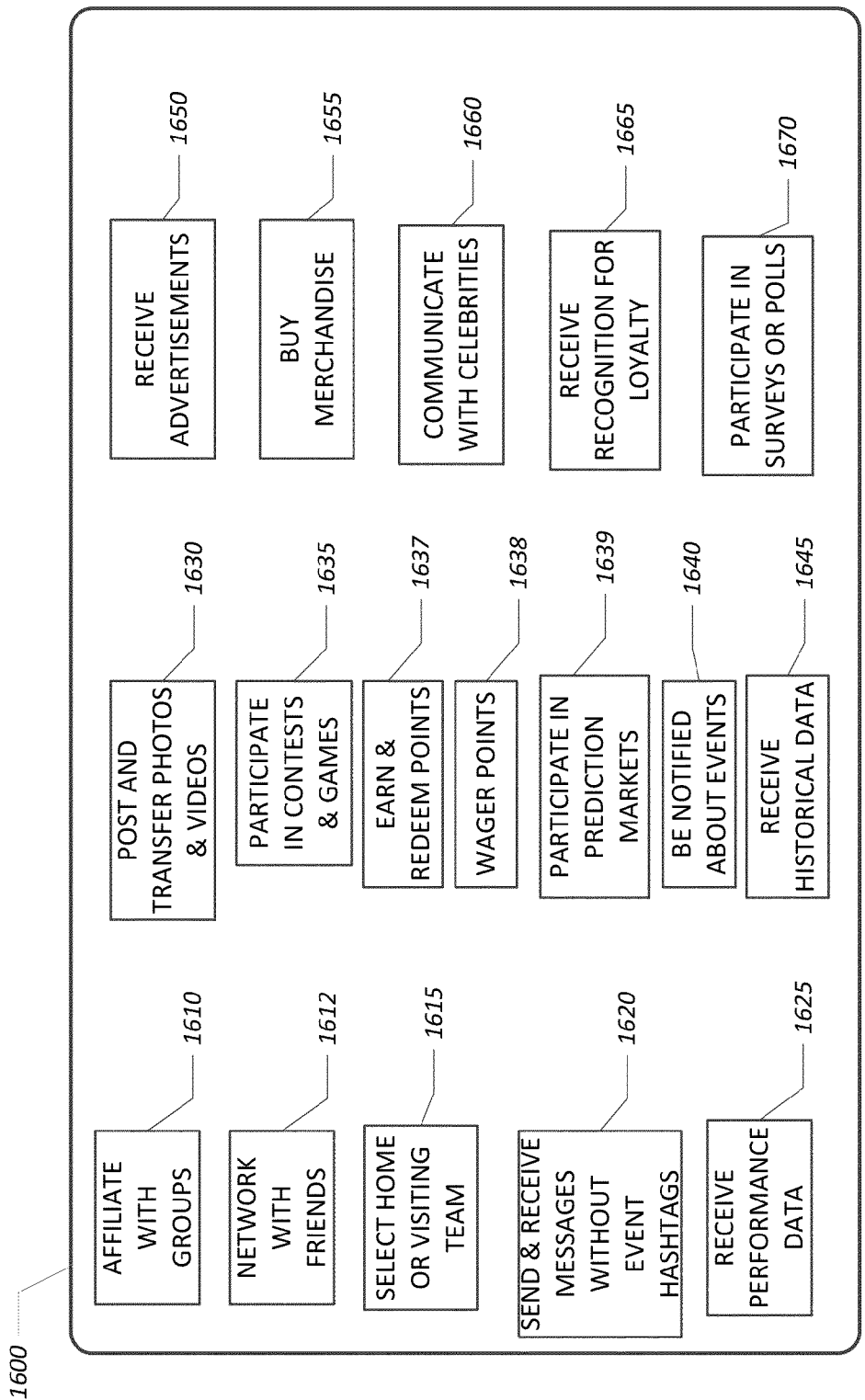
FIG. 16 is a conceptual diagram that illustrates exemplary services that might be provided by a FNS within the social networking category.

FIG. 16 is a conceptual diagram that illustrates exemplary services that might be provided by a FNS 300 relating to social networking 1520. (Some of these services also fit other categories shown in FIG. 15. Social networking 1520 is provided to the fan 200 through their PSD 320. Exemplary services might allow a fan 200: (1) To join 1610 with a group of other fans 200, or create a new group. (2) To network 1612 with "friends" who are also attending an event; (3) To choose 1615 whether they want to affiliate with the home or the away team, in the context of a two-team sporting event. (4) To send and receive 1620 text or other messages. Such messages might be exchanged with other group members, or with any of the types of fans 200 shown in FIG. 2. Preferably, to participate, a fan 200 will not have to identify the particular venue 800 or the event 100 they are attending with a hashtag. (5) To receive 1625 data (e.g., game statistics) about the performance 1100 or related performances 1100. (6) To post 1630 photos, videos, and other digital content to groups and another fans 200. (7) To participate 1635 in contests and games 1560, such as that described in relation to FIGS. 22 and 23. Such contests and games 1560 may be provided by the FNMS 310 through the FNA 510 to fans 200. (8) To earn and redeem 1637 valuable points 2699. (9) To wager 1638 such points 2699 among friends, social groups, or the fans 200 of the event 100 generally. (10) To participate 1639 in prediction markets, preferably using points 2699. (11) To be notified 1640 about upcoming and related events. (12) To receive 1645 historical information (e.g., season statistics) related to the performance 1100. (13) To receive 1650 advertising. (14) To buy 1655 merchandise. (15) To communicate 1660 with celebrities (e.g., performers). (16) to receive 1665 recognition for loyalty (e.g., receive a memento for attending a specified number of home games during a season). (17) to participate, using their PSD 320, in surveys or polls, conducted by event 100 management through the FNMS 310.

A posting might be directed by the FNMS 310 to a scoreboard or other similar display, possibly upon request of a fan 200. The FNMS 310 might also transmit to a fan 200, and the fan 200 might receive video or AN relating to the event 100 or venue 800, such as instant replay video.

Conventional messaging systems require a sender to specify one or more addresses to which a message is to be sent, such as an e-mail address or text number (each considered a separate "Address"). For some social networks, one or more recipients ("followers") can pre-select a particular sender's Address and receive all messages from such sender. The sender would also identify the message through the use of a keyword(s) by using a hashtag (#) (an "Identifying Subject") and all senders' messages with the same Identifying Subject would be posted together in a message stream. Identifying Subjects are specific to a hashtag. For example, recipients viewing a message stream entitled #Yankeesbaseball will see different posts than #NYYankeesbaseball or #Yanksbaseball, and the viewers of these three message streams will not be "connected together"—even if are all attending the same Yankees baseball game. In conventional messaging, the Address or Identifying Subject is the link between a sender(s) message and recipient(s) who receive or view a message(s).

Because a FNS 300 is aware of the respective and evolving states 1400 of fans 200 relative to an event 100, messaging and other forms of sharing through the FNA 510 can eliminate such address multiplicity through event-based messaging. For example, all groups associated with a ballgame and available to fans 200 who are actually present might be displayed in a menu through the FNA 510. Because this list of groups can contain groups exclusively associated with this event 100, it would be far easier to navigate, and to find relevant information in, than more conventional SNAs external to the event 100 or the super-event 1110. The list of groups available to fans 200 who are not present might be different from those who are attending.

Event-based messaging (EBM) does not require an Address or Identifying Subject. Rather with EBM, messages posted by any fan 200 can be streamed to all other qualified fans 200 at the same event 100, and only to such qualified fans 200. The venue 800 and the event 100 becomes the link between the sender and receiver of a message rather than an Address or Identifying Subject and all qualified fans can be connected together in the same message stream without having to know the Address of other fans at the event, or be subject to the vagaries of slight differences in the Identifying Subject (such as those for the Yankees above) that prevent such connection. Team-based and venue-based messaging offer advantages similar to EBM.

Figure 17:
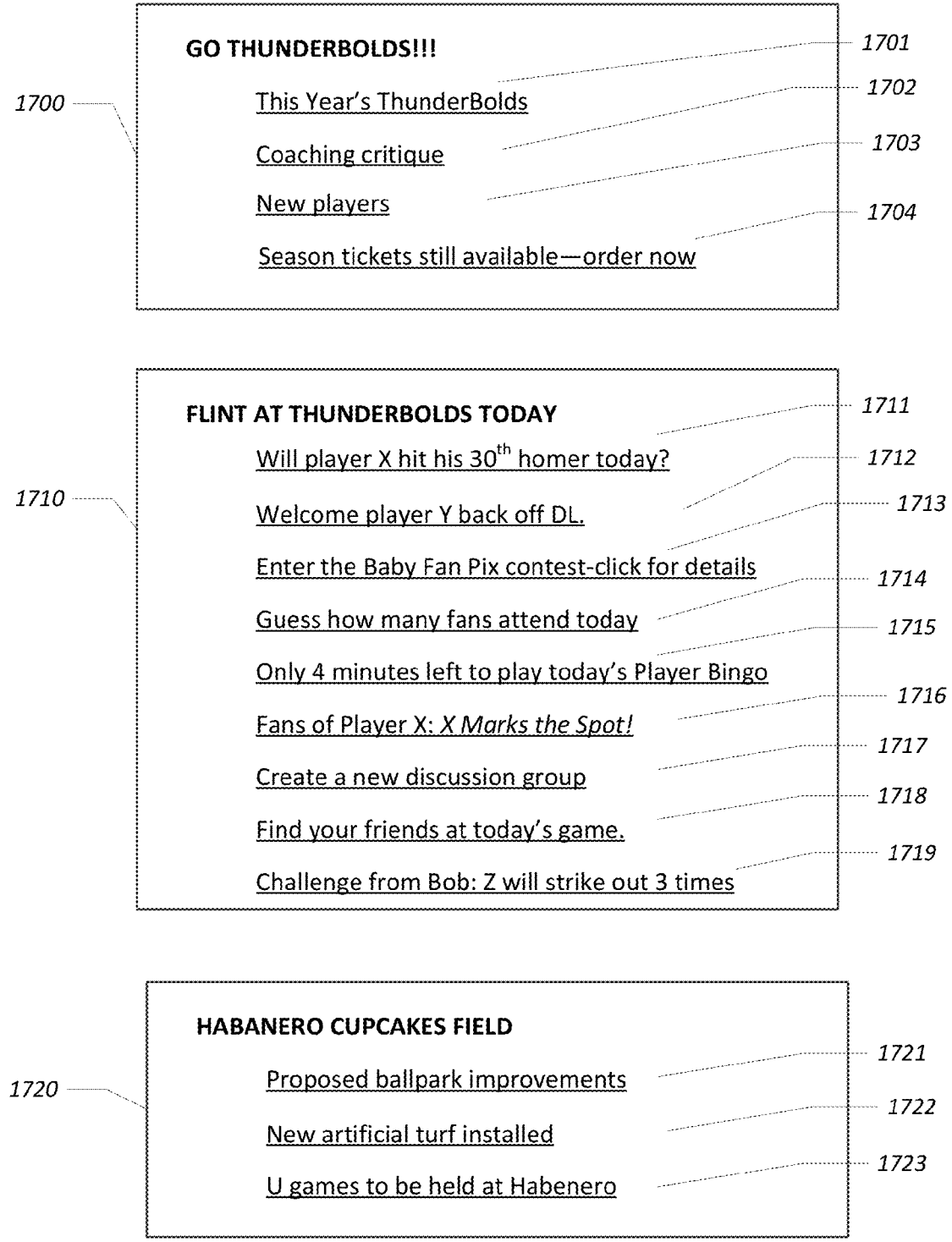
FIG. 17 shows examples of opportunities, provided by a FNS to fans attending an event, for team-based messaging, event-based messaging, venue-based messaging, games, contests, wagering, and "friends" networking.

FIG. 17 shows examples of opportunities, provided by a FNS 300 to fans attending an event, for EBM, team-based messaging, and venue-based messaging, games, contests, and wagering. Three windows, which might be displayed to a fan 200 at a baseball game through the GUI 530 on their PSD 320. The windows might be displayed simultaneously on the GUI 530, or separately. Entries are underlined to suggest that they are links. If the user selects a link, more information about that entry might pop up on the GUI 530. The organization of entries in these windows is not particularly realistic, but hopefully they will make more concrete some of the concepts presented so far. The top window 1700 is dedicated to entries relating to a particular team, which might correspond to the FNMS 310 of this FNS 300; the middle window 1710, to the event 100, today's game; the lower window 1720, to the venue 800. No hashtag or other identifier is required to participate in messaging 1510 and other ENSs 1500 for the team, the game, or the ballpark; such identification is inherent in attendance by a registered and qualified fan 200 at this event.

Several of the links shown in FIG. 17 give the fan 200 the opportunity to participate in a discussion group, possibly in response to a news item; these include: Link 1701; Link 1702; Link 1703; Link 1712; Link 1716; Link 1721; Link 1722; and Link 1723. Link 1717 is a link to another window, allowing the fan 200 to initiate their own discussion group. Link 1704 is link to a sales offer, which might offer the user points 2699. Link 1711 and Link 1713 are contests 2680, which might also offer points 2699 to the winner(s). Link 1718 is a link to a list of the "friends" of this fan 200 currently attending (or alternatively, somehow participation, possibly from home) the game. Link 1719 is an offer for a wager from friend Bob (see, e.g., FIG. 24). Link 1715 is a link to an opportunity to play a contest, such as that described in FIG. 22. Note that the content and arrangement of the GUI 530 may, and probably will, change during the course of a super-event 1110, event 100, or performance 1100.

Figure 18:
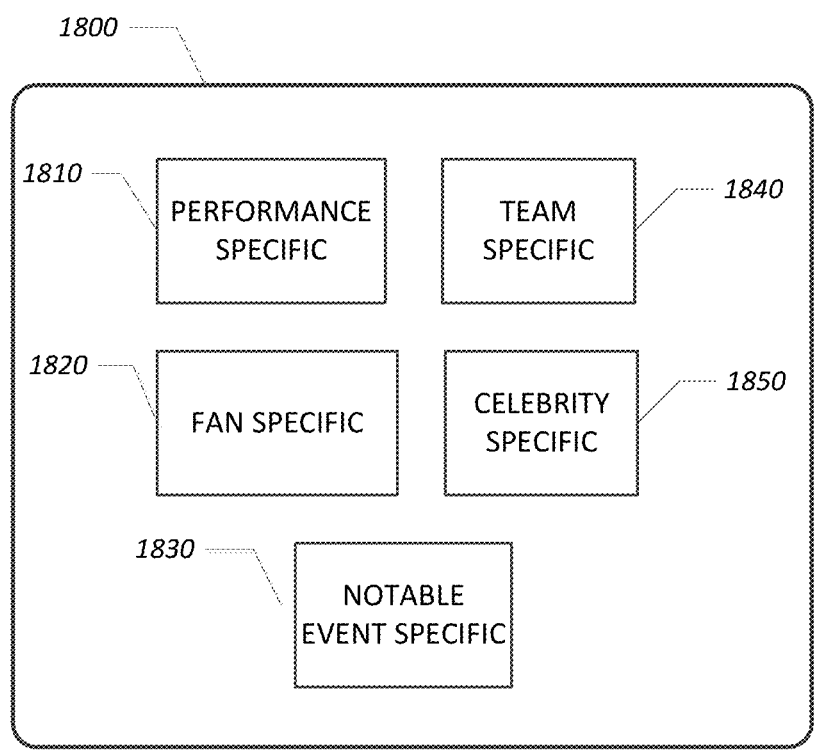
FIG. 18 is a conceptual diagram that illustrates ways that memorabilia offered to fans might be customized through a FNS.

Through the FNA 510, the FNMS 310 may offer custom products 1800, customized in various ways, such as those shown in FIG. 18. A custom product 1800 might depict or represent something specific 1810 to the performance 1100, such as a logo or other representation of the two competing teams in a ballgame, and a date. A custom product 1800 might depict or represent something specific 1840 to a team (e.g., home or away), that the fan 200 has chosen to affiliate with. A product might depict or represent something specific 1850. A product might depict or represent something specific 1830 to some occurrence during the performance 1100, like the winning team, or a record that was set during the performance 1100, or a photo of a soloist. Possibly the most interesting kind of customization would be fan-specific 1820. For example, a fan 200 might upload a picture of a family member or a "selfie" (self-photograph), taken at the performance 1100. The picture might be combined with one of the other kinds of customization, and included, for example, in a framed photo, on a t-shirt, or on a coffee mug. Depending on its type, a custom product 1800 might be delivered by shipping; picked up at a store in the venue 800; or if digital, downloaded through the FNA 510.

Figure 19:
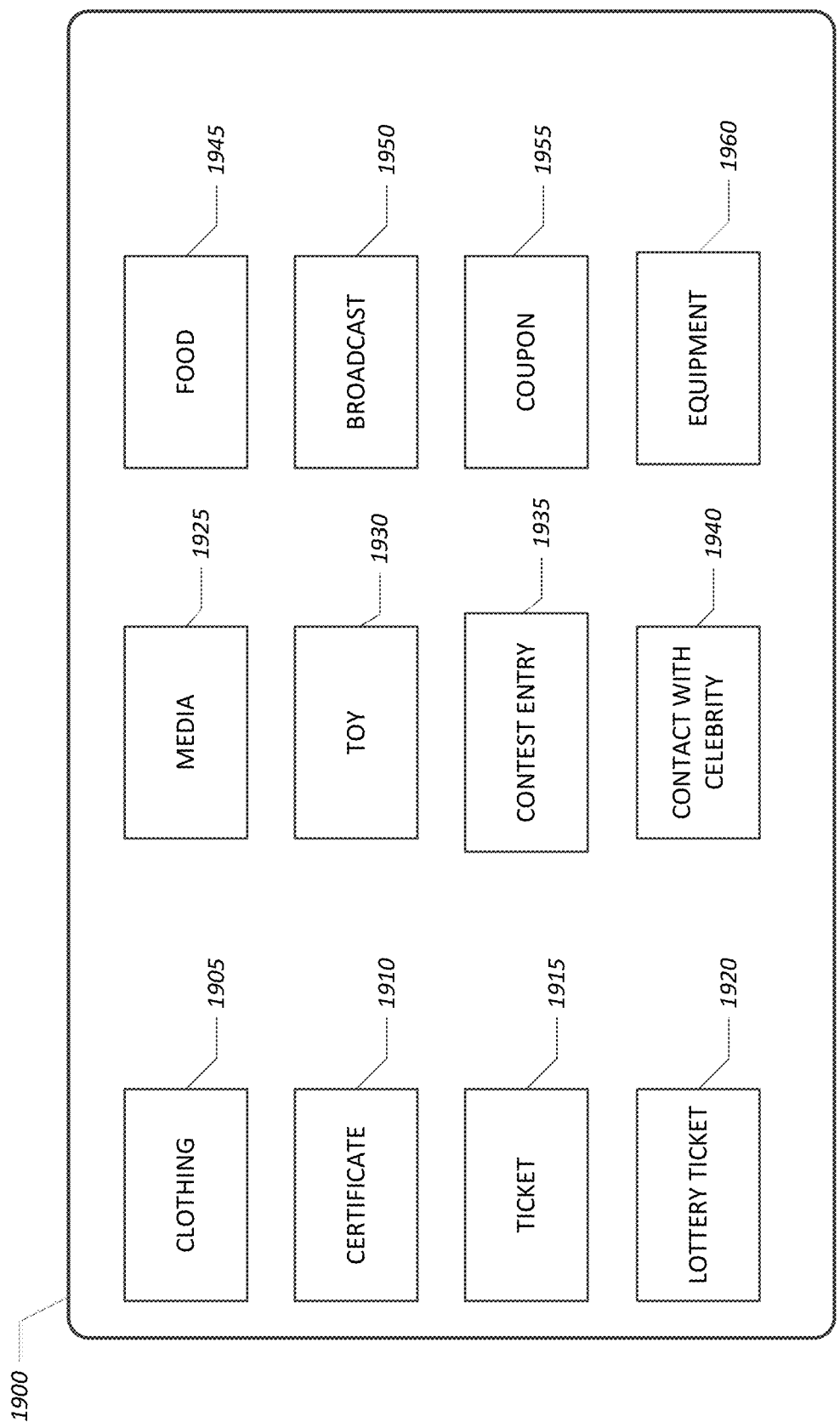
FIG. 19 is a conceptual diagram that illustrates types of memento products that might be offered to, and in some cases customized by, fans through a FNS.

FIG. 19 is a conceptual diagram that illustrates types of memento 1900 products that might be offered to, and in some cases customized by, fans 200 through a FNS 300. Such mementos 1900 may include clothing 1905; a certificate 1910, such as proof of attendance; a ticket 1915 to another performance 1100; a lottery ticket 1920; media 1925, such as a recording or video; a toy 1930, such as a bobble-head doll; an entry 1935 for a contest conducted by the FNS 300 and run through the FNA 510 during the event 100; some kind of contact with a celeb 1940, perhaps a signature or a face-to-face meeting; food; a broadcast 1950 opportunity, such as the right to post a child's birthday on a display in the venue 800; a coupon 1955, which might be redeemed at a store in the venue 800; or an item of equipment 1960 from the performance 1100, such as a game ball or an actor's ruby slippers. Any such memento 1900 might be awarded to a winner of a contest.

FIG. 20 is a flowchart that illustrates how social networking "friends" might be identified by, and interact through, a FNS 300. Various SNSs allow people to designate other people as "friends" (e.g., FACEBOOK®); "followers" (e.g., TWITTER®); "contacts" (e.g., LINKEDIN®); "circles"; "groups"; or other terms indicating a voluntary social, professional, or business relationship between or among individuals. We will use the term "Friend", with an upper case 'F', generically for such relationships. Note that an FNS 300, at any level (see FIG. 3) may maintain its own list(s) of Friends, possibly allowing people to establish such relationships through their FNA 510.

As defined in Wikipedia, "Friending is the act of adding someone to a list of Friends on a social networking service." If Friending occurs through the FNA 510 and the SNS is the FNS 300 itself, then the FNS 300 will know if two Friends are present at an event 100 and, depending on the granularity of the geolocation approach(es) being used, may even know where they are sitting. The FNMS 310, maintains its own list of identifiers (IDs) of fans 200 in storage 430.

However, if Friending occurred through an external SNS such as FACEBOOK®, then FNS 300 might be able to access the Friends list of the fan 200 on that other SNS. This may require that the fan 200 give permission for such access; that the permission be communicated to the other SNS; and that somehow the FNS 300 must be able to match the ID of the fan 200 in the FNS 300 with their ID in the SNS. Presumably, their ID in the SNS can be provided to the FNS 300 through the UI of the FNA 510 when the fan 200 gives the FNS 300 permission to access the SNS. Access by the FNS 300 to the Friends list of the other SNS will ordinarily be done through a contractual relationship between the FNMS 310 and management of the SNS. In some embodiments, a fan 200 may be able to log into the SNS using their PSD 320, and then through the SNS itself log into the FNS 300. When this approach is implemented, permission, communication of permission, and ID matching might all be able to be accomplished with a single click.

At a single event 100, a fan may have multiple relevant lists of Friends contacts. If FNS 300 has access to a list of someone's Friends, then the geolocation services, in conjunction with the FNS 300 and the FNAs 510 of the Friends, can detect social pairs of Friends who are attending the event 100. Social networking Friendship is quasi-contractual, and hence although a Friendship relationship is usually reflexive (if A is a Friend of B, then B is a Friend of A), Friends do not necessarily form groups. For example, A may have Friends B and C, while B has Friends A and D.

At the 2000 of FIG. 20, a fan 200 is detected 2010 by the FNMS 310, in collaboration with the FNA 510 and the geolocation system 570 of their PSD 320, as entering the venue 800—See FIG. 6-14 for exemplary details. If 2015 Friends networking is not active and enabled by the FNS 300, then the process ends 2099. If Friends networking is active and enabled by the FNS 300, then a check may be made whether Friends networking is active through the FNA 510 on the fan's PSD 320; the FNS 300 might (or might not) give the fan control over whether the Friends networking feature is enabled. If 2020 Friends networking is not active on the PSD 320, the process ends. Otherwise, the FNS 300 (or the FNA 510, depending on access means), accesses 2030 the list(s) of Friends. Note that there may be more than one list of Friends if the fan 200 participates in more than one networking group that is enabled by both the FNS 300 and the FNA 510. If 2040 Friends on such Friends lists are present in the venue 800, then Friends networking of the fan with those Friends will be established 2050. Friends networking might include notification to both Friends in a pair of the presence of the other; the ability of mutual Friends to form a group, or to together or individually engage in any of the activities described in FIG. 16. Rewards might be awarded to groups, such as points 2699, or credit toward superfan recognition.

Figure 21:
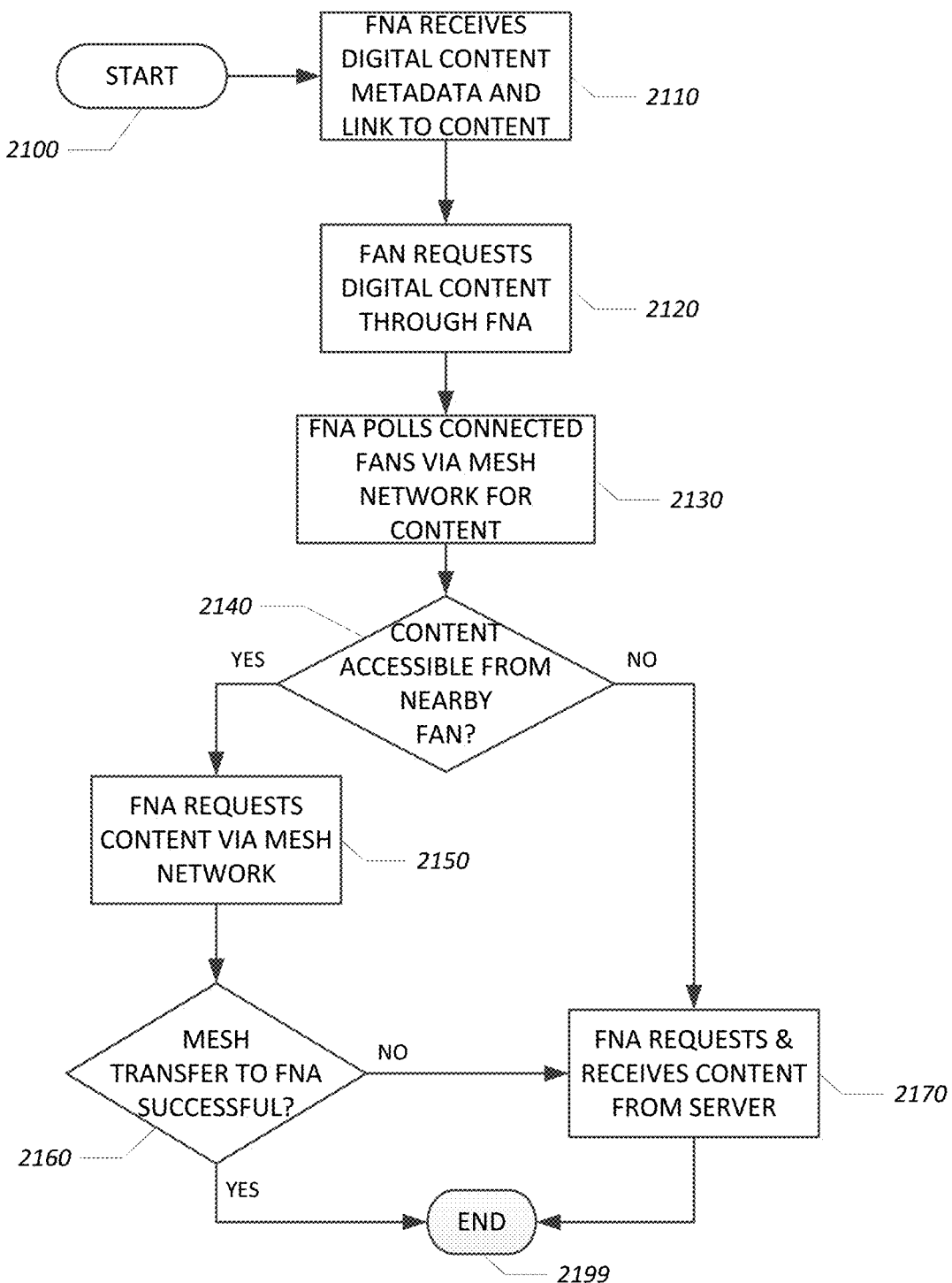
FIG. 21 is a flowchart illustrating sharing of digital content among fans using mesh networking.

FIG. 21 is a flowchart illustrating sharing of digital content among fans using mesh networking. Such digital content might include, for example, digital images, AN tracks, and documents. A fan 200 might want to request to download such digital content through the UI 445 of the FNA 510 on their PSD 320. Ordinarily, the request for the digital content would be transmitted by the FNA 510 to a server of the FNS 300, and the server would, if possible, either download the content from its own storage, or first upload the content from the PSD 320 of another fan 200. Mesh networking uses, when feasible, direct fan-to-fan communication, and may be able to eliminate the server from uploading and downloading the content, thereby reducing load upon the server and the FNMS 310, and possibly reducing transfer times. After the start 2100 in FIG. 21, the fan 200 becomes aware that certain digital content exists through the FNA 510. This will involve the FNA 510 receiving 2110 metadata about the digital content and a link identifying the content. This information may have been received from the FNMS 310 or from another fan 200. The fan 200 then requests 2120 the digital content through the FNA 510. The FNA 510 polls 2130 the fans 200 participating in the FNS 300 via the mesh network; mesh network access might be, for example, by BLUETOOTH® or by WiFi. If 2140 the content is available from a nearby fan 200 through the mesh network, the FNA 510 requests 2150 the content. and if 2160 the transfer to the PSD 320 of the fan is successful, the process ends 2199. Otherwise, the FNA 510 requests and receives 2170 the content from the server.

Figure 22:
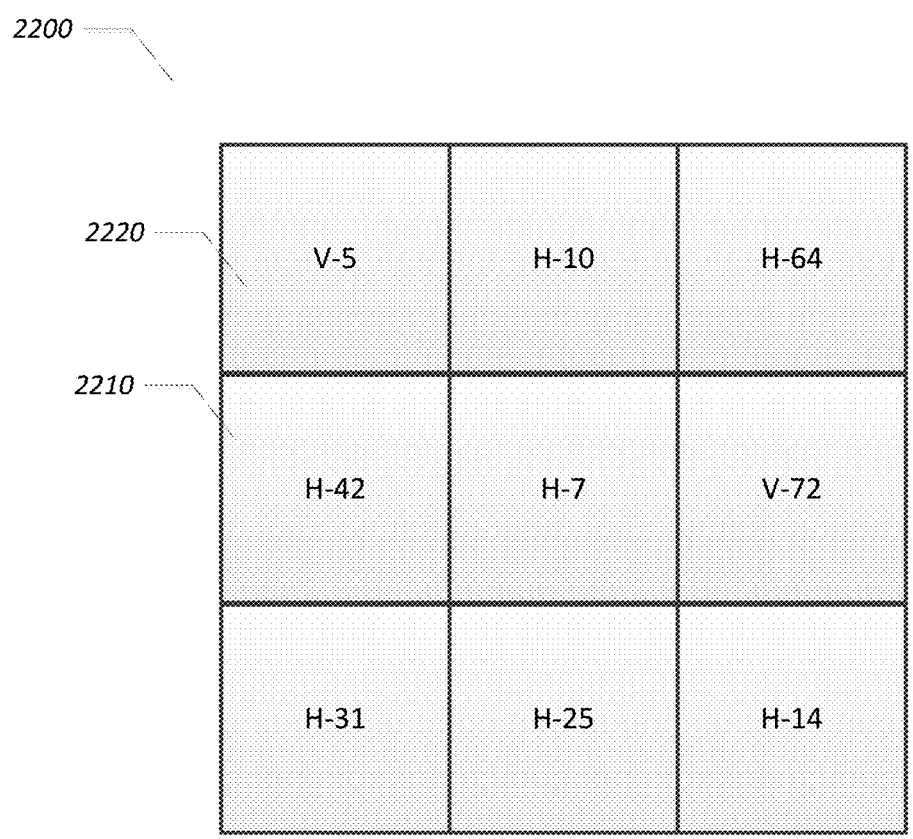
FIG. 22 is an exemplary game board that might be used in a game managed by a FNS.
Figure 23:
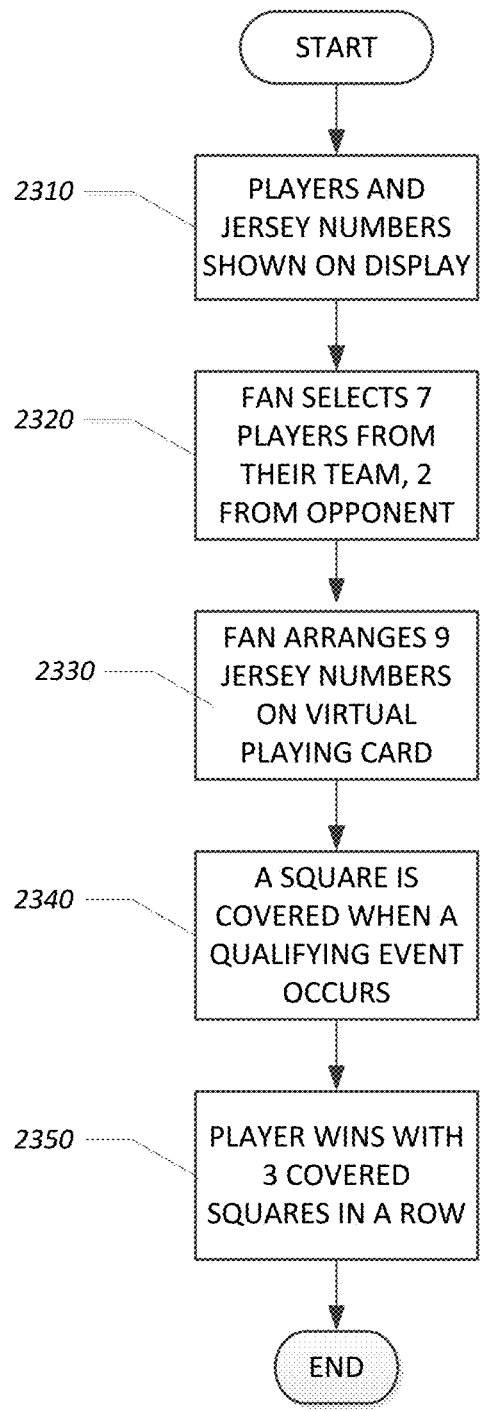
FIG. 23 is an exemplary set of rules that might be used by a FNS in conjunction with the game board of the previous figure.

FIG. 22 is an exemplary contest that might be run through a FNS 300. Preferably, all actions required by the fan 200 to participate in the contest will be available through a UI 445 of the PSD 320. In our example, the performance 1100 is a sporting event, but the concept might be used in any context in which unrehearsed or random happenings happen during the performance 1100. The contest is played on a game board 2200 similar to Bingo, and has similar rules regarding winning. In this contest, however, the fan 200 may have some control over game board 2200 contents and arrangement. FIG. 23 is a flowchart illustrating an exemplary embodiment of contest rules. The fan 200 receives 2310 a list of players and their jersey numbers, displayed on their PSD 320. The fan selects 2320 from the jersey numbers. In some embodiments, the FNS 300 fully randomizes the choices of players. The fan 200 may be required to select a certain number of players from each team; for example, 7 home team players and 2 away team players. Once they pick their players, in some embodiments the fan 200 gets to arrange 2330 them on the board; in others, the arrangement may be randomized. The game board 2200 of FIG. 22 shows such an arrangement of home team and visiting team jersey numbers. For example, square 2210 contains home player number 42, and square 2220 contains visiting player number 5. The player is allowed to cover 2340 a square upon a specific type of happening during the contest; for example, a home team player gets a hit; the home team pitcher strikes out an opposing batter; or a visiting team player is struck out. The fan 200 wins 2350 if they fill N squares adjacent in a row, column, or diagonal of the grid, where N is the grid dimension. The particular board shown is a 3×3 grid. Bingo is traditionally played on a 5×5 grid. The actual dimension of the square grid may be chosen by the managers of the event 100, depending upon the number of fans 200, the values of the prizes, and the target number of winners.

It should be noted that contests and games are slightly different. Fans compete with each other in a game but not in a contest. FIGS. 22 and 23 describe a bingo-like contest. As an example of a game, fans 200 who are present at an event 100 might be requested to submit a photo, taken at the event 100, by a certain time. Through the FNA 510, all or some subset of fans 200 might be asked to pick a favorite from among the submitted photos. The remaining set of candidate photos could be narrowed iteratively by additional fan polls through the FNA 510, until a "fan photo of the event" emerges. The winner might receive a memento, reward, prize, points 2699, or other recognition.

Figure 24:
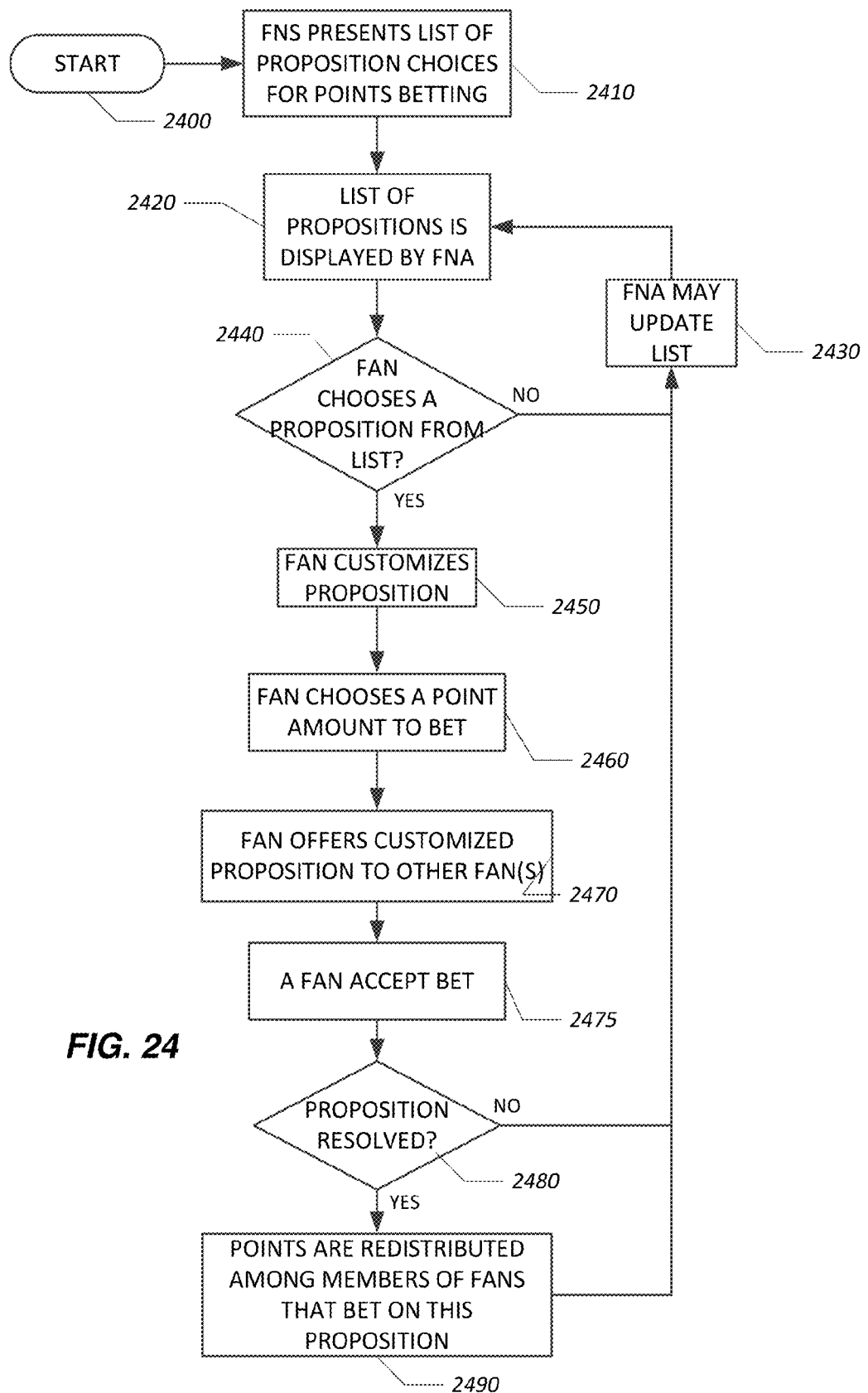
FIG. 24 is a flowchart illustrating a process for wagering points among fans of a FNS.
Figure 25:
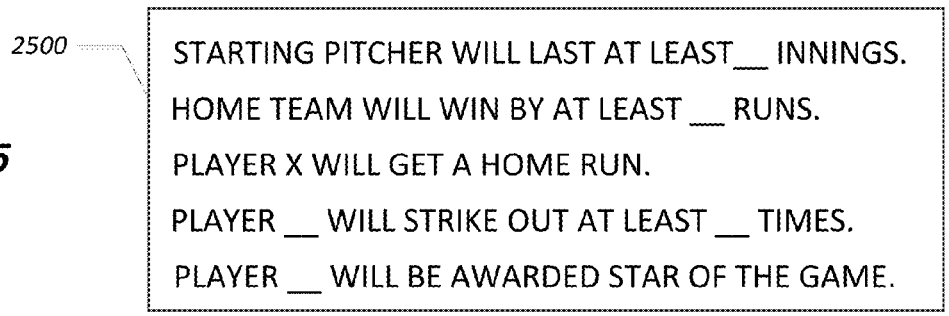
FIG. 25 illustrates a list of propositions relating to a baseball game, some customizable, from which a fan might select as the basis for a wager.

FIG. 24 is a flowchart illustrating a process for betting between fans participating in a FNS 300 during an event 100. Betting might be facilitated by a FNS 300, in cooperation with the FNAs 510 and PSDs 320 of fans 200, during the performance 1100, the event 100, the super-event 1110, or some other interval. A wager may be based on a proposed future outcome, a "bet proposition" (e.g., a particular player getting at least one hit) either occurring or not. A given bet proposition might be made available by the FNMS 310 for a wager that might be offered by a fan 200 to a Friend or set of Friends; with another fan 200; with a social group within the FNS 300; or with any other subset of FNS 300 members, such as fans 200 attending the event 100. Note, as discussed in connection with FIG. 3, that more than one FNS 300 might be available to a given fan 200 for betting during an event 100. After the 2400 start of FIG. 24, the FNS 300 presents 2410 a list that includes bet propositions 2500 choices to some subset of the set of fans 200. A given bet proposition 2500 might be customizable, or not. FIG. 25 illustrates a list of customizable bet propositions 2500 for a baseball game, from which a fan might choose as the basis for a bet. Entries in the list might be chosen by management of the FNS 300, and might evolve during the event 100. An entry might be entered into the FNS 300 through a management UI 450 to a central FNMS 310, such as that illustrated by FIG. 7. Customization opportunities, timing for appearance, and the fan base who will receive the bet propositions 2500 may all be chosen by FNS 300 management. FIG. 25 shows five bet propositions 2500, of which one is not customizable; one has two blanks for customization; and the remainder have one blank. If 2440 the fan 200 chooses a bet proposition 2500 from the list available through the GUI 530 of the FNA 510 then the fan 200 may, if appropriate to the given bet proposition 2500, customize 2450 the bet proposition 2500. Through the GUI 530, the fan 200 may choose 2460 a number of points 2699 (see FIG. 26) to bet; the FNA 510 might also allow (not shown) the fan 200 to set odds. The fan 200 offers 2470 the bet to other fans 200. One or more other fans 200 accept 2475 the bet. At some point, the bet proposition 2500 is proved 2480 to be either true or false, and points 2699 are redistributed 2490 among the betting fans 200 accordingly by the FNMS 310. The FNMS 310 through the FNS 300 may update 2430 the list during the interval of betting. The process may continue until that interval ends.

The FNS 300 might implement other forms of betting or trading among sets of fans 200 detected by geolocation in connection with an event 100, such as described in connection with FIG. 8-15. For example, fans 200 might be able, through the FNA 510 on their PSD 320, to trade, through one or more prediction markets, in futures of outcomes, as selected by the FNS 300 management.

Figure 26:
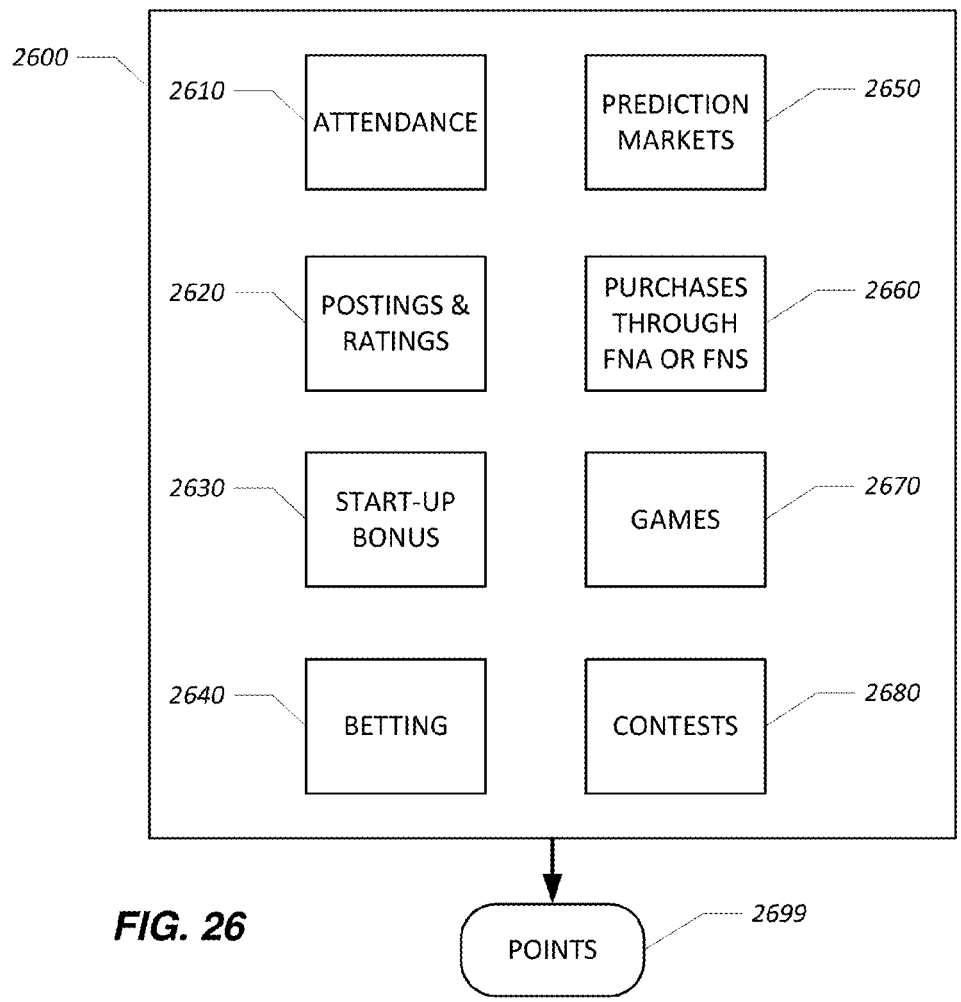
FIG. 26 illustrates possible elements of a loyalty program, whereby a fan might earn points to be redeemed for goods, services, cash, or recognition.

FIG. 26 illustrates possible elements of a loyalty program 2600, whereby a fan might earn points 2699 to be redeemed for, e.g., goods, services, cash, or recognition. A fan 200 might earn points 2699 for attendance 1430 at events. For example, a bonus might be awarded to a fan 200 that attends a certain number of games in a season. A fan 200 might earn points 2699 for postings 2620 to social networks implemented by the FNS 300. Other fans 200 might be given the opportunity to react to a posting 2620 by indicating a ranking, or a LIKE/DISLIKE indication. For example, the FNS 300 might invite fans 200 to post their best "baby fan" video. The fan 200 who posted the video that received the highest rating from other fans might receive a certain number of points 2699. As another example, a fan 200 might accumulate points 2699 from ratings of their posts 2620 throughout a season. At a point near the end of the season, the fan 200 with the most points 2699 from ratings might receive a bonus of points 2699 from the FNMS 310. A fan 200 might be given a start-up bonus 2630 for joining the FNS 300. A fan 200 might gain or lose points 2699 by betting, as illustrated by FIG. 24 and FIG. 25; or by participating in some form of points 2699 trading in outcome futures, such as prediction markets 2650. A fan 200 might acquire points 2699 by purchases 2660 of goods or services made through the FNS 300 or through the FNA 510; or through participation in games 2670 or contests 2680.

FIG. 27 illustrates kinds of FNMS data 2700 that might be included by a FNMS in storage 430. Databases might include registered fans data 2710; venues data 2720; events data 2730; and current event/venue data 2740. The organization shown here is merely exemplary.

Note that the concepts of the invention extend to embodiments in which there is an event 100, but no performance 1100 as such. For example, a day at an amusement park might be treated as an event 100. Also, some points may use a different system of boundaries or layers, or different tracking method. In such embodiments, some details of the timeline and possible states 1400 will differ from FIGS. 11 and 14, respectively, but the inventive concepts of fan geolocation and fan/event states still apply.

Of course, many variations of the above method are possible within the scope of the invention. The present invention is, therefore, not limited to all the above details, as modifications and variations may be made without departing from the intent or scope of the invention. Consequently, the invention should be limited only by the following claims and equivalent constructions.

What is claimed is:

1. A system, comprising:
a) a portable smart device (PSD), which includes
(i) a processing system, which includes a processor,
(ii) at least one wireless communication system, implemented at least partially in hardware, through which the processing system can communicate externally, and
(iii) computer-accessible tangible storage, including data and software instructions used by the processing system,
(iv) a user interface (UI) that includes a hardware display, and
(v) a geolocation system that tracks geolocations of the PSD; and
b) a fan software application (FSA), which is saved in the storage and is executed by the processing system, that
(i) transmits a sequence of the geolocations through a first of the wireless communication systems, directed to a first fan network management system (FNMS),
(ii) based upon the sequence of transmitted geolocations, qualifies the PSD as attending a first event,
(iii) receives a communication, from the first FNMS over one of the wireless communication systems, metadata that describes an item of digital content,
(iv) receives through the UI a user communication that directs the FSA to obtain the item,
(v) makes a determination by polling whether some second PSD, which has qualified with the first FNMS as attending the first event, contains the item and is accessible directly by one of the wireless communication systems of the first PSD, and
(vi) requests and obtains the item directly from such a second PSD if possible based on the determination, and otherwise requests and obtains the item from the first FNMS.

2. The system of claim 1, wherein the FSA further
(vii) receives, through the first wireless communication system, a registration acknowledgement from the first FNMS for the PSD to receive event networking services at events where the first FNMS provides them.

3. The system of claim 2, wherein the FSA further
(viii) receives, through the UI, registration data, and
(ix) transmits the registration data through the first wireless communication system, directed to the first FNMS, and
(x) receives the registration acknowledgement in response to transmitting the registration data.

4. The system of claim 1, wherein the FSA further
(vii) through the UI, receives digital content and a fan selection to receive the digital content, the FSA limiting recipients to fans identified with PSDs that have qualified to receive event networking services from the first FNMS at the first event.

5. The system of claim 1, wherein the FSA further
(vii) receives through the wireless communication interface address information of fans identified with PSDs that have qualified to receive event networking services from the first FNMS at the first event.

6. The system of claim 1, wherein the FSA further
(vii) tracks geolocations of the PSD as it moves, and transmits such geolocations through the wireless communication interface, directed to a second FNMS,
(viii) qualifies the PSD as a first fan device to receive event networking services from the second FNMS at a second event, in a second venue, by satisfying geolocation and time constraints associated with the second venue and the second event, and (ix) receives event networking services through the wireless communication interface from the second FNMS during the second event while in the second venue.

7. The system of claim 1, wherein the FSA further
(vii) qualifies the PSD as a first fan device to receive event networking services from the first FNMS at a second event, in the first venue, by satisfying geolocation and time constraints associated with the first venue and the second event, and
(viii) receives event networking services through the wireless communication interface from the first FNMS during the second event while in the first venue.

8. The system of claim 1, wherein the FSA further
(vii) qualifies the PSD as a first fan device to receive event networking services from the first FNMS at a second event, in a second venue, by satisfying geolocation and time constraints associated with the second venue and the second event, and
(viii) receives ENSs through the wireless communication interface from the first FNMS during the second event while in the second venue.

9. The system of claim 1, wherein the FSA uses GPS technology to track geolocations of the PSD.

10. The system of claim 1, wherein the FSA uses beacon technology to track geolocations of the PSD.

11. The system of claim 1, wherein the FSA switches between GPS technology and beacon technology to track geolocations of the PSD, depending upon geolocation of the PSD as the PSD moves, relative to the first venue.

12. The system of claim 1, wherein the first event has an event period, including a starting date and time and an ending date and time, the event period defined by the first FNMS.

13. The system of claim 12, the constraints for participating include a requirement that the PSD be continuously geolocated for a specified period of time within a bounded geographical area that includes at least a portion of the first venue.

14. The system of claim 13, wherein the specified period of time is within the event period.

15. The system of claim 1, wherein the FSA receives event networking services from the first FNMS during a super-event period, which includes and extends the event period.

16. The system of claim 13, wherein the specified period of time to qualify must occur between a starting time and an ending time specified by the first FNMS.

17. The system of claim 1, wherein the event networking services include exchanging computer-readable content with other fan devices at the first event.

18. The system of claim 1, wherein the computer-readable content is a text message, an image, a video segment, or an audio segment.

19. The system of claim 1, wherein the event networking services allow the first fan device to create, through the FNMS, a new social group associated with fan devices attending the event.

20. The system of claim 1, wherein the event networking services allow the first fan device, through the FNMS, to exchange computer-readable content with fan devices associated with existing social groups and attending the event.

21. The system of claim 1, wherein the event networking services allow the first fan device to identify and text message through the FNMS with fan devices of social networking Friends corresponding to the first fan device and receiving event networking services from the first FNMS during the first event.

22. The system of claim 21, wherein the FSA receives a list of social networking Friends through the wireless communication interface from the FNMS.

23. The system of claim 21, wherein the list includes a Friend that was identified to the FNMS from a social network that is not managed by the FNMS.

24. The system of claim 21, wherein upon selection through the user interface of an entry from the list and specification through the user interface of digital content, the FSA transmits the digital content through the wireless communication interface, directed to a PSD corresponding to the selected entry.

25. The system of claim 1, wherein the FSA further
(vii) upon receipt of a request or demand from the FNS, changes how it tracks geolocations of the PSD.

26. The system of claim 25, wherein the request or demand from the FNS causes the FSA to change to a coarser or to a finer resolution tracking method.

27. The system of claim 26, wherein the PSD further includes
(vi) a rechargeable battery, whose rate of electricity consumption depends upon whether the tracking method uses the coarser or the finer resolution.

28. The system of claim 26, wherein the request or demand from the FNS occurs when the tracking determines that the PSD has moved to inside the outer boundary but outside the inner boundary.

29. The system of claim 1, wherein the FSA further
(vii) offers an event networking service to a plurality of PSDs that have qualified as attending the first event, in a first venue, which is not offered to a plurality of PSDs that have not so qualified,
(viii) receives event networking services through the first wireless communication system from the first FNMS during the first event while in the first venue,
(ix) tracks geolocations of the PSD as it moves, and transmits such geolocations through the wireless communication interface, directed to a first fan network management system (FNMS), wherein the tracking determines
(A) whether the PSD is outside an outer boundary, inside the outer boundary, or inside an inner boundary, wherein the outer boundary and the inner boundary are defined within the storage and are specific to a first venue, and
(B) whether the PSD has qualified as a first fan device at the first event in the first venue by remaining within the inner boundary for a qualified time interval, wherein the qualifying time interval is defined in the storage.

30. The system of claim 1, wherein the FSA further
(vii) displays through the user interface an interactive game or contest,
(viii) receives user input regarding the game or contest through the user interface,
(ix) transmits the user input regarding the game or contest through one of the wireless communication systems to the FNMS, and
(x) receives from the FNMS through one of the wireless communication systems an indication that the user has won a memento, reward, prize, or points as a result of the transmitted user input.

* * * * *